(12) United States Patent
Richert

(10) Patent No.: US 9,070,039 B2
(45) Date of Patent: *Jun. 30, 2015

(54) TEMPORAL WINNER TAKES ALL SPIKING NEURON NETWORK SENSORY PROCESSING APPARATUS AND METHODS

(71) Applicant: Brain Corporation, San Diego, CA (US)

(72) Inventor: Micah Richert, San Diego, CA (US)

(73) Assignee: BRIAN CORPORATION, San Diego, CA (US)

(*) Notice: Subject to any disclaimer, the term of this patent is extended or adjusted under 35 U.S.C. 154(b) by 13 days.

This patent is subject to a terminal disclaimer.

(21) Appl. No.: 13/757,607

(22) Filed: Feb. 1, 2013

(65) Prior Publication Data

US 2014/0219497 A1    Aug. 7, 2014

(51) Int. Cl.
*G06K 9/00* (2006.01)
*G06K 9/36* (2006.01)
*G06K 9/46* (2006.01)
*G06N 3/04* (2006.01)
*G06F 15/18* (2006.01)

(52) U.S. Cl.
CPC ............. *G06K 9/36* (2013.01); *G06K 9/4623* (2013.01); *G06N 3/049* (2013.01)

(58) Field of Classification Search
USPC ......... 382/100, 107, 122–123, 155–157, 162, 382/168, 173, 181, 191, 232, 254, 263, 382/273–276, 305, 312, 103, 291; 706/20, 706/48, 18, 26, 34; 235/449
See application file for complete search history.

(56) References Cited

U.S. PATENT DOCUMENTS

| 5,063,603 | A | 11/1991 | Burt |
| 5,138,447 | A | 8/1992 | Shen et al. |

(Continued)

FOREIGN PATENT DOCUMENTS

| CN | 102226740 A | 10/2011 |
| JP | 4087423 | 3/1992 |

(Continued)

OTHER PUBLICATIONS

Berkes and Wiskott. Slow feature analysis yields a rich repertoire of complex cell properties. *Journal of Vision* (2005) vol. 5 (6).

(Continued)

*Primary Examiner* — Seyed Azarian
(74) *Attorney, Agent, or Firm* — Gazdzinski & Associates, PC

(57) ABSTRACT

Apparatus and methods for contrast enhancement and feature identification. In one implementation, an image processing apparatus utilizes latency coding and a spiking neuron network to encode image brightness into spike latency. The spike latency is compared to a saliency window in order to detect early responding neurons. Salient features of the image are associated with the early responding neurons. An inhibitory neuron receives salient feature indication and provides inhibitory signal to the other neurons within an area of influence of the inhibitory neuron. The inhibition signal reduces probability of responses by the other neurons to stimulus that is proximate to the feature thereby increasing contrast within the encoded data. The contrast enhancement may facilitate feature identification within the image. Feature detection may be used for example for image compression, background removal and content distribution.

20 Claims, 20 Drawing Sheets

(56) References Cited

U.S. PATENT DOCUMENTS

| | | | |
|---|---|---|---|
| 5,216,752 A | 6/1993 | Tam | |
| 5,272,535 A | 12/1993 | Elabd | |
| 5,355,435 A | 10/1994 | Deyong et al. | |
| 5,638,359 A | 6/1997 | Peltola et al. | |
| 5,673,367 A | 9/1997 | Buckley | |
| 5,875,108 A | 2/1999 | Hoffberg | |
| 6,009,418 A | 12/1999 | Cooper | |
| 6,014,653 A | 1/2000 | Thaler | |
| 6,035,389 A | 3/2000 | Grochowski | |
| 6,418,424 B1 | 7/2002 | Hoffberg et al. | |
| 6,458,157 B1 | 10/2002 | Suaning | |
| 6,509,854 B1 | 1/2003 | Morita | |
| 6,545,705 B1 | 4/2003 | Sigel et al. | |
| 6,545,708 B1 | 4/2003 | Tamayama | |
| 6,546,291 B2 | 4/2003 | Merfield et al. | |
| 6,581,046 B1 | 6/2003 | Ahissar | |
| 6,625,317 B1 | 9/2003 | Gaffin et al. | |
| 7,054,850 B2* | 5/2006 | Matsugu | 706/48 |
| 7,580,907 B1 | 8/2009 | Rhodes | |
| 7,653,255 B2 | 1/2010 | Rastogi | |
| 7,737,933 B2 | 6/2010 | Yamano et al. | |
| 7,765,029 B2 | 7/2010 | Fleischer et al. | |
| 7,849,030 B2 | 12/2010 | Ellingsworth | |
| 8,000,967 B2 | 8/2011 | Taleb | |
| 8,015,130 B2 | 9/2011 | Matsugu | |
| 8,103,602 B2 | 1/2012 | Izhikevich | |
| 8,160,354 B2 | 4/2012 | Paquier | |
| 8,200,593 B2 | 6/2012 | Guillen | |
| 8,281,997 B2* | 10/2012 | Moran et al. | 235/449 |
| 8,311,965 B2 | 11/2012 | Breitwisch | |
| 8,315,305 B2 | 11/2012 | Petre | |
| 8,346,692 B2* | 1/2013 | Rouat et al. | 706/20 |
| 8,390,707 B2 | 3/2013 | Yamashita | |
| 8,416,847 B2 | 4/2013 | Roman | |
| 8,467,623 B2 | 6/2013 | Izhikevich | |
| 8,583,286 B2 | 11/2013 | Fleischer et al. | |
| 8,712,941 B2 | 4/2014 | Izhikevich et al. | |
| 2002/0038294 A1 | 3/2002 | Matsugu | |
| 2003/0050903 A1 | 3/2003 | Liaw | |
| 2003/0216919 A1 | 11/2003 | Roushar | |
| 2004/0136439 A1 | 7/2004 | Dewberry | |
| 2004/0170330 A1 | 9/2004 | Fogg | |
| 2004/0193670 A1 | 9/2004 | Langan et al. | |
| 2005/0015351 A1 | 1/2005 | Nugent | |
| 2005/0036649 A1 | 2/2005 | Yokono et al. | |
| 2005/0283450 A1 | 12/2005 | Matsugu | |
| 2006/0094001 A1 | 5/2006 | Torre | |
| 2006/0129728 A1 | 6/2006 | Hampel | |
| 2006/0161218 A1 | 7/2006 | Danilov | |
| 2007/0022068 A1 | 1/2007 | Linsker | |
| 2007/0176643 A1 | 8/2007 | Nugent | |
| 2007/0208678 A1 | 9/2007 | Matsugu | |
| 2008/0100482 A1 | 5/2008 | Lazar | |
| 2008/0199072 A1 | 8/2008 | Kondo | |
| 2008/0237446 A1 | 10/2008 | Oshikubo | |
| 2009/0043722 A1 | 2/2009 | Nugent | |
| 2009/0287624 A1 | 11/2009 | Rouat et al. | |
| 2010/0036457 A1 | 2/2010 | Sarpeshkar | |
| 2010/0081958 A1 | 4/2010 | She | |
| 2010/0086171 A1 | 4/2010 | Lapstun | |
| 2010/0100482 A1 | 4/2010 | Hardt | |
| 2010/0166320 A1 | 7/2010 | Paquier | |
| 2010/0225824 A1 | 9/2010 | Lazar | |
| 2010/0235310 A1 | 9/2010 | Gage et al. | |
| 2010/0299296 A1 | 11/2010 | Modha et al. | |
| 2011/0016071 A1 | 1/2011 | Guillen | |
| 2011/0119214 A1 | 5/2011 | Breitwisch | |
| 2011/0119215 A1 | 5/2011 | Elmegreen | |
| 2011/0137843 A1 | 6/2011 | Poon et al. | |
| 2011/0160741 A1 | 6/2011 | Asano | |
| 2012/0011090 A1 | 1/2012 | Tang | |
| 2012/0083982 A1 | 4/2012 | Bonefas | |
| 2012/0084240 A1 | 4/2012 | Esser et al. | |
| 2012/0109866 A1 | 5/2012 | Modha | |
| 2012/0303091 A1 | 11/2012 | Izhikevich | |
| 2012/0308076 A1 | 12/2012 | Piekniewski | |
| 2012/0308136 A1 | 12/2012 | Izhikevich | |
| 2013/0046716 A1* | 2/2013 | Chan et al. | 706/18 |
| 2013/0073484 A1 | 3/2013 | Izhikevich | |
| 2013/0073491 A1 | 3/2013 | Izhikevich | |
| 2013/0073492 A1 | 3/2013 | Izhikevich | |
| 2013/0073495 A1 | 3/2013 | Izhikevich | |
| 2013/0073496 A1 | 3/2013 | Szatmary | |
| 2013/0073498 A1 | 3/2013 | Izhikevich | |
| 2013/0073499 A1 | 3/2013 | Izhikevich | |
| 2013/0073500 A1 | 3/2013 | Szatmary | |
| 2013/0151450 A1 | 6/2013 | Ponulak | |
| 2013/0218821 A1 | 8/2013 | Szatmary | |
| 2013/0251278 A1 | 9/2013 | Izhikevich | |
| 2013/0297539 A1 | 11/2013 | Piekniewski et al. | |
| 2013/0297541 A1 | 11/2013 | Piekniewski et al. | |
| 2013/0297542 A1 | 11/2013 | Piekniewski et al. | |
| 2013/0325766 A1 | 12/2013 | Petre et al. | |
| 2013/0325768 A1 | 12/2013 | Sinyavskiy | |
| 2013/0325773 A1 | 12/2013 | Sinyavskiy | |
| 2013/0325774 A1 | 12/2013 | Sinyavskiy | |
| 2013/0325775 A1 | 12/2013 | Sinyavskiy | |
| 2013/0325777 A1* | 12/2013 | Petre et al. | 706/26 |
| 2014/0012788 A1 | 1/2014 | Piekniewski | |
| 2014/0016858 A1 | 1/2014 | Richert | |
| 2014/0032458 A1 | 1/2014 | Sinyavskiy | |
| 2014/0032459 A1 | 1/2014 | Sinyavskiy | |
| 2014/0052679 A1 | 2/2014 | Sinyavskiy | |
| 2014/0064609 A1 | 3/2014 | Petre et al. | |
| 2014/0122397 A1 | 5/2014 | Richert | |
| 2014/0122398 A1 | 5/2014 | Richert | |
| 2014/0122399 A1 | 5/2014 | Szatmary | |
| 2014/0156574 A1 | 6/2014 | Piekniewski | |

FOREIGN PATENT DOCUMENTS

| | | |
|---|---|---|
| RU | 2108612 C1 | 10/1998 |
| RU | 2406105 C2 | 12/2010 |
| RU | 7474561 C2 | 7/2011 |
| WO | 2008083335 A2 | 7/2008 |
| WO | 2008132066 A1 | 11/2008 |

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepagcs,cwi ,n11-sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Cuntz et al 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of inter-spike intervals yield accurate entropy estimates from small datasets.' Journal of neuroscience methods 173.1 (2008): 129.

Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all. jsp?arnmber=5596678&tag=1.

Field, G.; Chichilnisky, E. Information Processing in the Primate Retina: Circuitry and Coding. *Annual Review of Neuroscience*, 2007. 30(1), 1-30.

Fiete, et al. Spike-Time-Dependent Plasticity and Heterosynaptic Competition Organize Networks to Produce Long Scale-Free Sequences of Neural Activity. *Neuron 65*, Feb. 25, 2010, pp. 563-576.

(56) References Cited

OTHER PUBLICATIONS

Floreano et al., 'Neuroevolution: from architectures to learning' Evol. Intel. Jan. 2008 1:47-62, [retrieved Dec. 30, 2013] [retrieved online from URL:<http://inforscience.epfl.ch/record/112676/files/FloreanoDuerrMattiussi2008.p df>.

Földiák, P. Learning invariance from transformation sequences. *Neural Computation*, 1991, 3(2), 194-200.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.

Gerstner et al. (1996) A neuronal learning rule for sub-millisecond temporal coding. *Nature* vol. 383 (6595) pp. 76-78.

Gewaltig et al., 'NEST (Neural Simulation Tool)', Scholarpedia, 2007, pp. 1-15, 2(4): 1430, doi: 10.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gluck, Stimulus Generalization and Representation in Adaptive Network Models of Category Learning [online], 1991 [retrieved on Aug. 24, 2013]. Retrieved from the Internet<URL:http:// www.google.com/url?sa=t&rct=j&q=Giuck+%022STIMULUS+ GENERALIZATION+AND+REPRESENTATIO N+1 N + ADAPTIVE+NETWORK+MODELS+OF+CATEGORY+LEARN I NG%22+ 1991.

Gollisch et al. 'Rapid neural coding in the retina with relative spike latencies.' Science 319.5866 (2008): 1108-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 10.3389/conf.fninf.2011.08.00098.

Graham, Lyle J., The Surf-Hippo Reference Manual, http:// www.neurophys.biomedicale.univparis5. fr/-graham/surf-hippo-files/Surf-Hippo%20Reference%20Manual.pdf, Mar. 2002, pp. 1-128.

Hopfield JJ (1995) Pattern recognition computation using action potential timing for stimulus representation. *Nature* 376: 33-36.

Izhikevich E. M. and Hoppensteadt F.C. (2009) Poiychronous Wavefront Computations. *International Journal of Bifurcation and Chaos*, 19:1733-1739.

Izhikevich E.M. (2004) Which Model to Use for Cortical Spiking Neurons? *IEEE Transactions on Neural Networks*, 15:1063-1070.

Izhikevich E.M. (2006) Polychronization: Computation With Spikes. *Neural Computation*, 18:245-282.

Izhikevich et al., 'Relating STDP to BCM'. Neural Computation (2003) 15, 1511-1523.

Izhikevich, E.M. (2007) Dynamical Systems in Neuroscience: The Geometry of Excitability and Bursting, *The MIT Press*, 2007.

Izhikevich, 'Simple Model of Spiking Neurons', IEEE Transactions on Neural Networks, vol. 14, No. 6, Nov. 2003, pp. 1569-1572.

Janowitz, M.K.; Van Rossum, M.C.W. Excitability changes that complement Hebbian learning. *Network, Computation in Neural Systems*, 2006, 17 (1), 31-41.

Karbowski et al., 'Multispikes and Synchronization in a Large Neural Network with Temporal Delays', Neural Computation 12, 1573-1606 (2000).

Khotanzad, Alireza, Classification of invariant image representations using a neural network, IEEF. Transactions on Acoustics, Speech, and Signal Processing vol. 38 No. 6 Jun. 1990 pp. 1028-1038.

Khotanzad, 'Classification of invariant image representations using a neural network' IEEF. Transactions on Acoustics, Speech, and Signal Processing, vol. 38. No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

Knoblauch, et al. Memory Capacities for Synaptic and Structural Plasticity, *Neural Computation* 2009, pp. 1-45.

Laurent, 'Issue 1—nnql—Refactor Nucleus into its own file—Neural Network Query Language' [retrieved on Nov. 12, 2013]. Retrieved from the Internet: URL:https:// code.google.com/p/nnql/issues/detail?id=1.

Laurent, 'The Neural Network Query Language (NNQL) Reference' [retrieved on Nov. 12, 2013]. Retrieved from the Internet: <URL'https://code.google.com/p/nnql/issues/detail?id=1>.

Lazar et al. 'A video time encoding machine', in Proceedings of the 15th IEEE International Conference on Image Processing (ICIP '08}, 2008, pp. 717-720.

Lazar et al. 'Consistent recovery of sensory stimuli encoded with MIMO neural circuits.' Computational intelligence and neuroscience (2010): 2.

Lazar et al. 'Multichannel time encoding with integrate-and-fire neurons.' Neurocomputing 65 (2005): 401-407.

Masquelier and Thorpe. Learning to recognize objects using waves of spikes and Spike Timing-Dependent Plasticity. *Neural Networks (IJCNN), The 2010 International Joint Conference on DOI*—10.1109/IJCNN.2010.5596934 (2010) pp. 1-8.

Masquelier, Timothee. 'Relative spike time coding and STOP-based orientation selectivity in the early visual system in natural continuous and saccadic vision: a computational model.' Journal of computational neuroscience 32.3 (2012): 425-441.

Meister, M. Multineuronal codes in retinal signaling. *Proceedings of the National Academy of sciences*. 1996, 93, 609-614.

Meister, M.; Berry, M.J. The neural code of the retina, *Neuron*. 1999, 22, 435-450.

Nichols, A Re configurable Computing Architecture for Implementing Artificial Neural Networks on FPGA, Master's Thesis, The University of Guelph, 2003, pp. 1-235.

Oster M., Lichtsteiner P., Delbruck T, Liu S. A Spike-Based Saccadic Recognition System, *ISCAC 2007. IEEE International Symposium on Circuits and Systems*, 2009, pp. 3083-3086.

Paugam-Moisy et al. 'Computing with spiking neuron networks.' Handbook of Natural Computing, 40 p. Springer, Heidelberg (2009).

Paugam-Moisy et al., "Computing with spiking neuron networks" G. Rozenberg T. Back, J. Kok (Eds.). Handbook of Natural Computing, Springer-Verlag (2010) [retrieved Dec. 30, 2013], [retrieved online from link.springer.com].

Pavlidis et al. 'Spiking neural network training using evolutionary algorithms, In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

Rekeczky, et al., "Cellular Multiadaptive Analogic Architecture: A Computational Framework for UAV Applications." May 2004.

Revow M., Williams C., and Hinton, G.E., 1996, Using Generative Models for Handwritten Digit Recognition, *IEEE Trans, on Pattern Analysis and Machine Intelligence*, 18, No. 6, Jun. 1996.

Sanchez, Efficient Simulation Scheme for Spiking Neural Networks, *Doctoral Thesis*, Universita di Granada Mar. 28, 2008, pp. 1-104.

Sato et al., 'Pulse interval and width modulation for video transmission.' Cable Television. IEEE Transactions on 4 (1978): 165-173.

Schemmel, J., et al. Implementing synaptic plasticity in a VLSI spiking neural network model, Proceedings of the 2006 International Joint Conference on Neural Networks, Jul. 2006 pp. 1-6.

Schnitzer, M.J.; Meister, M.; Multineuronal Firing Patterns in the Signal from Eye to Brain. Neuron, 2003, 37, 499-511.

Serrano-Gotarredona, et al, "On Real-Time: AER 2-D Convolutions Hardware for Neuromorphic Spike-based Cortical Processing". Jul. 2008.

Simulink.RTM. model [online], [Retrieved on Dec. 10, 2013] Retrieved from &it:URL: http://www.mathworks.com/ products/simulink/index.html>.

Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

(56) References Cited

OTHER PUBLICATIONS

Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371%2Fjournal.pcbi.1000879#>.

Thomas S. and Riesenhuber, M, 2004, Realistic Modeling of Simple and Complex Cell Tuning in the HMAX Model, and Implications for Invariant Object Recognition in Cortex, *AI Memo* 2004-017 Jul. 2004.

Thorpe, S.J., Delorme, A. & VanRullen, R. (2001). Spike-based strategies for rapid processing. *Neural Networks* 14, pp. 715-725.

Thorpe, S.J., Guyonneau, R., Guilbaud, N., Allegraud, J-M. & VanRullen, R. (2004). SpikeNet: real-time visual processing with one spike per neuron. *Neurocomputing*, 58-60, pp. 857-864.

Tim Gollisch* and Markus Meister (2008) Rapid Neural Coding in the Retina with Relative Spike Latencies. *Science* 319:1108-1111.

Van Rullen R.; Thorpe, S. Rate Coding versus temporal order coding: What the Retinal ganglion cells tell the visual cortex. *Neural computation*, 2001, 13, 1255-1283.

VanRullen. R. & Koch, C. (2003). Is perception discrete or continuous? *Trends in Cognitive Sciences* 7(5), pp. 207-213.

VanRullen, R., Guyonneau, R. & Thorpe, S.J. (2005). Spike times make sense. *Trends in Neurosciences* 28(1).

Wallis, G.; Rolls, E. T. A model of invariant object recognition in the visual system. *Progress in Neurobiology*. 1997, 51, 167-194.

Wang 'The time dimension for scene analysis.' Neural Networks, IEEE Transactions on 16.6 (2005): 1401-1426.

Wiskott, L.; Sejnowski, T.J. Slow feature analysis: Unsupervised learning of invariances. *Neural Computation*, 2002, 14, (4), 715-770.

Zarandy, et al., "Bi-i: A Standalone Ultra High Speed Cellular Vision System", Jun. 2005.

\* cited by examiner

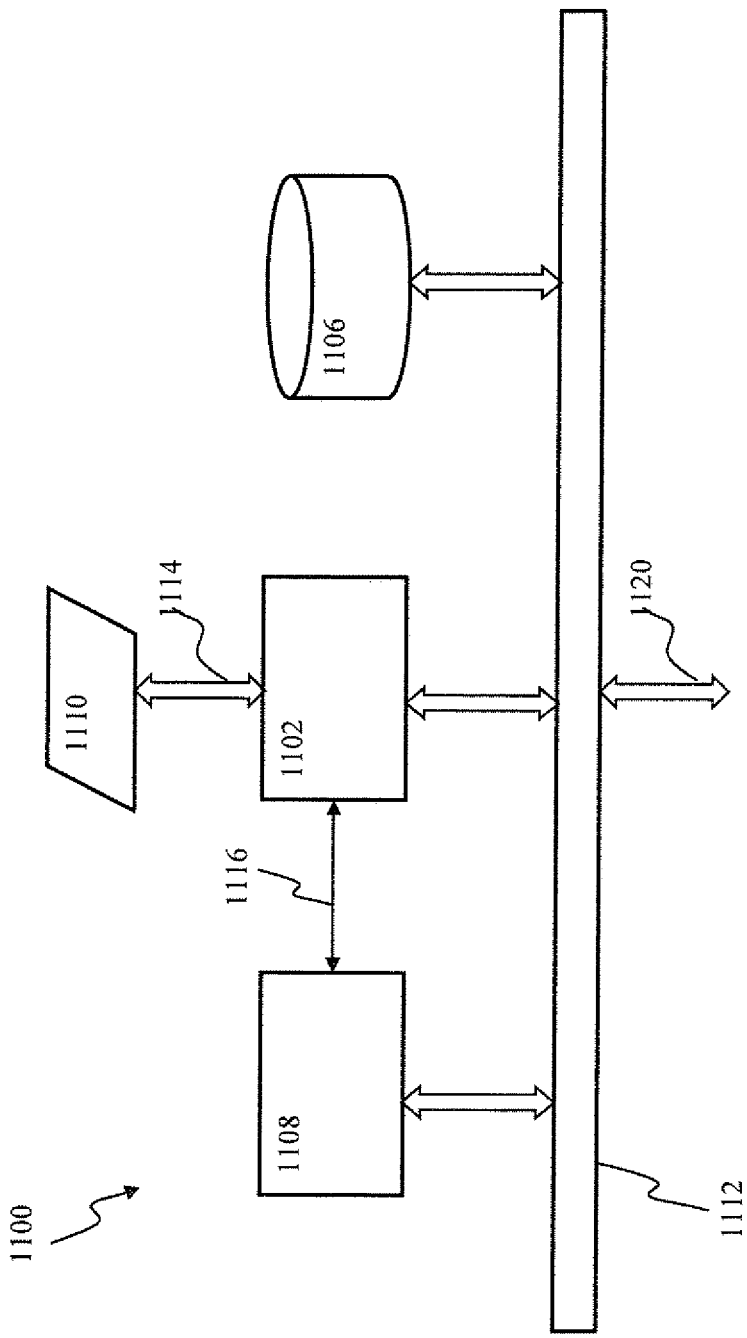

TEMPORAL WINNER TAKES ALL SPIKING NEURON NETWORK SENSORY PROCESSING APPARATUS AND METHODS

CROSS-REFERENCE TO RELATED APPLICATIONS

This application is related to a co-pending and co-owned U.S. patent application Ser. No. 13/465,924, entitled "SPIKING NEURAL NETWORK FEEDBACK APPARATUS AND METHODS", filed May 7, 2012, co-pending and co-owned U.S. patent application Ser. No. 13/540,429, entitled "SENSORY PROCESSING APPARATUS AND METHODS", filed Jul. 2, 2012, U.S. patent application Ser. No. 13/488,106, entitled "SPIKING NEURON NETWORK APPARATUS AND METHODS", filed Jun. 4, 2012, U.S. patent application Ser. No. 13/541,531, entitled "CONDITIONAL PLASTICITY SPIKING NEURON NETWORK APPARATUS AND METHODS", filed Jul. 3, 2012, U.S. patent application Ser. No. 13/548,071, entitled "SPIKING NEURON NETWORK SENSORY PROCESSING APPARATUS AND METHODS", filed Jul. 12, 2012, U.S. patent application Ser. No. 13/660,967, entitled "APPARATUS AND METHODS FOR ACTIVITY-BASED PLASTICITY IN A SPIKING NEURON NETWORK", filed Oct. 25, 2012, U.S. patent application Ser. No. 13/691,554, entitled "RATE STABILIZATION THROUGH PLASTICITY IN SPIKING NEURON NETWORK", filed Nov. 30, 2012, and U.S. patent application Ser. No. 13/710,042, entitled "CONTRAST ENHANCEMENT SPIKING NEURON NETWORK SENSORY PROCESSING APPARATUS AND METHODS", filed Dec. 10, 2012, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present innovation relates generally to artificial neuron networks, and more particularly in one exemplary aspect to computerized apparatus and methods for encoding visual input using spiking neuron networks.

2. Description of Related Art

Targeting visual objects is often required in a variety of applications, including education, content distribution (advertising), safety, etc. Existing approaches (such as use of heuristic rules, eye tracking, etc.) are often inadequate in describing salient features in visual input, particularly in the presence of variable brightness and/or color content that is rapidly variable (spatially and/or temporally).

Furthermore, while spiking neuron networks have been used to encode visual information, visual attention implementations comprising spiking neuron networks are often overly complex, and may not always provide sufficiently fast response to changing input conditions.

Accordingly, there is a need for apparatus and methods for implementing visual encoding of salient features, which provide inter alia, improved temporal and spatial response.

SUMMARY

The present disclosure satisfies the foregoing needs by providing, inter alia, apparatus and methods for detecting salient features in sensory input.

In a first aspect, a non-transitory computer-readable apparatus configured to store at least one computer processes thereon is disclosed. In one embodiment, the computer process is configured to detect an object in a sensory input. The computer process comprises a plurality of instructions configured to, when executed: based on at least one excitatory signal, generate an inhibitory signal configured to suppress generation of another excitatory signal, and thereby enable the object detection.

In one variant, the sensory input comprises a plurality of spikes associated with sensory signal of first modality and second modality. The at least one excitatory signal comprises one or more pulses generated based on a portion of the sensory input comprising first representation of the object based on the first modality. The other excitatory signal comprises one or more pulses configured to be generated based on another portion of the sensory input comprising second representation of the object based on the second modality. The first representation of the object is characterized by a parameter having a value that is different from value of the parameter associated with the sensory input of the first modality in an area proximate to the object.

In a second aspect, a method of detecting one or more salient features within an image set with a spiking neuron network is disclosed. In one embodiment, the method comprises: (i) providing a first stimulus comprising a first spectral parameter of a first image of the image set to a first portion of the network, (ii) providing a second stimulus comprising a second spectral parameter of a second image of the image set to a second portion of the network, (iii) based at least in part on the provision of the first stimulus, causing generation of a plurality of pulses by the first portion of the network, the plurality of pulses configured to encode the first parameter into a pulse latency, (iv) generating an inhibition signal based at least in part on two or more pulses of the plurality of pulses, the two or more pulses being proximate one another within a time interval, and (v) based at least in part on the inhibition signal, suppressing responses to the stimulus by at least one neuron of the second portion.

In a third aspect, a spiking neuron network processing apparatus configured to process sensory input comprising at least two attributes In one embodiment, the apparatus comprises: (i) one or more encoders, (ii) a detector bank comprising one or more detectors associated with each of the at least two attributes, and (iii) at least one inhibitory unit. The one or more encoders are configured to: (i) receive the sensory input, and (ii) encode the sensory input to produce a plurality a pulses. Each of the one or more detectors is configured to: (i) receive an encoded input for an associated attribute, and (ii) based on the encoded input generate a respective feed-forward signal. The at least one inhibitory unit is configured to: (i) receive at least one of one or more respective feed-forward signals, (ii) in response to the received at least one feed-forward signal, produce a feedback signal, and (iii) transmit the feedback signal to at least one of the one or more detectors. The feedback signal is configured to alter a response generation parameter of the at least one of the one or more detectors.

In a fourth aspect, a contrast increasing method is disclosed. In one embodiment, the method includes, inter alia, generating, at a neuron, an inhibitory indication based at least on a pulse-code representation of stimulus input.

In fifth aspect, a neural network apparatus is disclosed. In one embodiment, the neural network apparatus includes, inter alia, excitatory and inhibitory neurons configured to manage sensory contrast. In one variant, the apparatus is a computerized device implemented as, e.g., a visual prosthesis.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 11A is a block diagram illustrating a computerized system useful with salient feature detection mechanism in accordance with one implementation of the disclosure.

Figure 1:
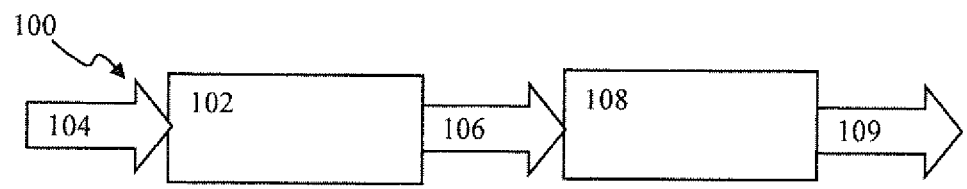
FIG. 1 is a block diagram illustrating a salient feature detection apparatus in accordance with one implementation of the disclosure.

All Figures disclosed herein are © Copyright 2013 Brain Corporation. All rights reserved.

DETAILED DESCRIPTION

Implementations of the present disclosure will now be described in detail with reference to the drawings, which are provided as illustrative examples so as to enable those skilled in the art to practice the invention. Notably, the figures and examples below are not meant to limit the scope of the present invention to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device", include, but are not limited to, personal computers (PCs) and minicomputers, whether desktop, laptop, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, and/or other devices capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), object-oriented environments such as the Common Object Request Broker Architecture (CORBA), Java™ (e.g., J2ME, Java Beans), Binary Runtime Environment (e.g., BREW), and/or other programming languages and/or environments.

As used herein, the terms "connection", "link", "transmission channel", "delay line", "wireless" means a causal link between any two or more entities (whether physical or logical/virtual), which enables information exchange between the entities.

As used herein, the terms "graded signal", "continuous signal", "real-world signal", "physical signal" may describe a non-spiking signal (either analog or non-binary discrete). A non-spiking signal may comprise three or more distinguishable levels.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other storage media.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, or software interface with a component, network or process including, without limitation, those of the FireWire (e.g., FW400, FW800), USB (e.g., USB2), Ethernet (e.g., 10/100, 10/100/1000 (e.g., Gigabit Ethernet), 10-Gig-E), MoCA, Coaxsys (e.g., TVnet™), radio frequency tuner (e.g., in-band or OOB, cable modem), Wi-Fi (e.g., 802.11), WiMAX (e.g., 802.16), PAN (e.g., 802,15), cellular (e.g., 3G, LTE/LTE-A/TD-LTE, GSM), IrDA families, and/or other network interfaces.

As used herein, the terms "pixel" and "photodetector", are meant generally to include, without limitation, any type of photosensitive circuit and/or device adapted for converting light signal (e.g., photons) into electrical form (e.g., current and/or voltage) and/or digital representation.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and/or any other pulse and/or pulse type associated with a discrete information transmission system and/or mechanism.

As used herein, the terms "pulse latency", "absolute latency", and "latency" are meant generally to refer to, without limitation, a temporal delay and/or a spatial offset between an event (e.g., the onset of a stimulus, an initial pulse, and/or just a point in time) and a pulse.

As used herein, the terms "pulse group latency", or "pulse pattern latency" refer to, without limitation, an absolute latency of a group (pattern) of pulses that is expressed as a latency of the earliest pulse within the group.

As used herein, the terms "relative pulse latencies" refer to, without limitation, a latency pattern or distribution within a group (or pattern) of pulses that is referenced with respect to the pulse group latency.

As used herein, the term "pulse-code" is meant generally to denote, without limitation, information encoding into a patterns of pulses (or pulse latencies) along a single pulsed channel or relative pulse latencies along multiple channels.

As used herein, the term "synaptic channel", "connection", "link", "transmission channel", "delay line", and "communications channel" are meant generally to denote, without limitation, a link between any two or more entities (whether physical (wired or wireless), or logical/virtual) which enables information exchange between the entities, and is characterized by a one or more variables affecting the information exchange.

As used herein, the term "Wi-Fi" refers to, without limitation, any of the variants of IEEE-Std. 802.11, related standards including 802.11a/b/g/n/s/v, and/or other wireless standards.

As used herein, the teiin "wireless" means any wireless signal, data, communication, or other interface including without limitation Wi-Fi, Bluetooth, 3G (e.g., 3GPP/3GPP2), HSDPA/HSUPA, TDMA, CDMA (e.g., IS-95, WCDMA), FHSS, DSSS, GSM, PAN/802.15, WiMAX (e.g., 802.16), 802.20, narrowband/FDMA, OFDM, PCS/DCS, LTE/LTE-A/TD-LTE, analog cellular, CDPD, satellite systems, millimeter wave or microwave systems, acoustic, infrared (e.g., IrDA), and/or other wireless interfaces.

Overview

In one aspect of the invention, improved apparatus and methods for encoding salient features in visual information, such as a digital image frame, are disclosed. In one implementation, the encoder apparatus may comprise a spiking neuron network configured to encode spectral illuminance (i.e., brightness and/or color) of visual input into spike latency. The input data may comprise sensory input provided by a lens and/or imaging pixel array, such as an array of digitized pixel values. Spike latency may be determined with respect to one another (spike lag), or with respect to a reference event (e.g., an onset of a frame, an introduction of an object into a field of view, etc.).

In one or more implementations, the latency may be configured inversely proportional to luminance of an area of the image, relative to the average luminance within the frame. Accordingly, the fastest response neurons (i.e., the spikes with the shortest latency) may correspond to the brightest and/or darkest elements within the image frame. The elements meeting certain criteria (e.g., much different brightness, as compared to the average) may be denoted as "salient features" within the image frame. accost In one or more implementations, one or more partitions of the spiking neuron network may be configured to encode two or more sensory input attributes. For instance, the input may comprise an image, and the two attributes may comprise pixel contrast and pixel rate of displacement. In some implementations, the image may include a salient feature. The spike latency is associated with (i) the contrast; and (ii) the displacement of the pixels corresponding to the feature, and may fall proximate one another within a latency range. Spike latencies associated with more than one aspect of the image may, inter alfa, aid the network in detection of feature saliency.

In accordance with one aspect of the disclosure, the aforementioned fast response or "first responder" neurons may be coupled to one or more inhibitory neurons also referred to as "gate units". These gate neurons may provide inhibitory signals to the remaining neuron population (i.e., the neurons that have not responded yet). Such inhibition (also referred to herein colloquially as "temporal winner takes all") may prevent the rest of the network from responding to the remaining features, thereby effectuating salient feature encoding, in accordance with one or more implementations.

The inhibitory units may be characterized by an area of influence (also referred to as the inhibitory extent). In some implementations, the inhibitory extent may be configured in accordance with a circular, and/or another shape of aperture using a constant and/or range dependent inhibition strength. In some implementations, the localized inhibition may be utilized to increase local contrast of a salient feature. Such contrast enhancement may be effectuated, for example, by suppressing network response to non-salient stimuli within the inhibitory extent.

Saliency Detection Apparatus

Detailed descriptions of various implementations of the apparatus and methods of the disclosure are now provided. Although certain aspects of the innovations set forth herein can best be understood in the context of encoding digitized images, the principles of the disclosure are not so limited and implementations of the disclosure may also be used for implementing visual processing in, for example a handheld communications devices. In one such implementation, an encoding system may include a processor embodied in an application specific integrated circuit, which can be adapted or configured for use in an embedded application (such as a prosthetic device).

Realizations of the innovations may be for example deployed in a hardware and/or software implementation of a neuromorphic computerized system.

FIG. 1 illustrates one exemplary implementation of salient feature detection apparatus of the disclosure. The apparatus 100 of FIG. 1 may be configured to receive sensory input 104, detect a salient feature within the input, and to generate salient feature indication 109. The saliency of an item (such as an object, a person, a pixel, etc.) may be described by a state or quality by which the item stands out relative to its neighbors. Saliency may arise from contrast between the item and its surroundings, such as a black object on a white background, or a rough scrape on a smooth surface.

The input may take any number of different forms, including e.g., sensory input of one or more modalities (e.g., visual and/or touch), electromagnetic (EM) waves (e.g., in visible, infrared, and/or radio-frequency portion of the EM spectrum) input provided by an appropriate interface (e.g., a lens and/or antenna), an array of digitized pixel values from a digital image device (e.g., a camcorder, media content server, etc.), or an array of analog and/or digital pixel values from an imaging array (e.g., a charge-coupled device (CCD) and/or an active-pixel sensor array).

Figure 1A:
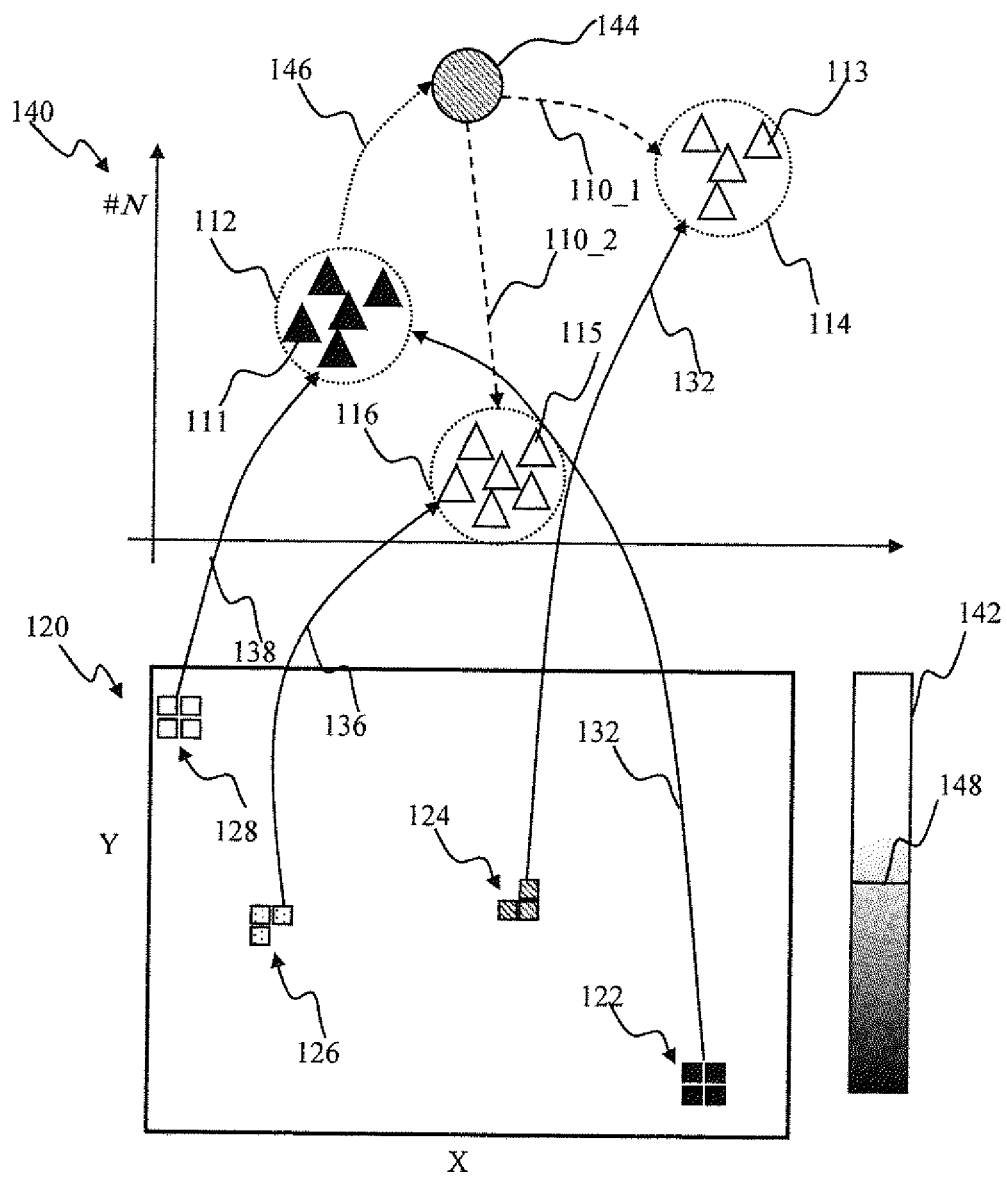
FIG. 1A is a graphical illustration of a temporal "winner takes all" saliency detection mechanism in accordance with one implementation of the disclosure.

In certain implementations, the input comprises pixels arranged in a two-dimensional array 120, as illustrated in FIG. 1A. The pixels may form one or more features 122, 124, 126, 128 that may be characterized by a spectral illuminance parameter such as e.g., contrast, color, and/or brightness, as illustrated by the frame 120 in FIG. 1A. The frame brightness may be characterized by a color map, comprising, for example, a gray scale mapping 142 illustrated in FIG. 1A.

The apparatus 100 of FIG. 1 comprises an encoder block 102 configured to encode the input 104. In one or more implementations, the encoder 102 may comprise spiking neuron network, capable of encoding the spectral illuminance parameter of the input frame 120 into a spike latency as described in detail, for example, in U.S. patent application Ser. No. 12/869,573, entitled "SYSTEMS AND METHODS FOR INVARIANT PULSE LATENCY CODING", filed Aug. 26, 2010, incorporated herein by reference in its entirety.

The apparatus 100 of FIG. 1 also comprises a detection block 108, configured to receive the encoded signal 106. In some implementations, the detector 108 may be configured to receive the spike output 106, generated by the network of the block 102. The detection block 108 may in certain exemplary configurations be adapted to generate the output 109 indication using the temporal-winner-takes-all (TWTA) salient feature detection methodology, shown and described with respect to FIG. 1A below.

FIG. 1A illustrates one exemplary realization of the TWTA methodology. It is noteworthy that the designator "temporal-winner-takes-all" is used in the present context to denote signals (e.g., spikes) in the time domain that occur consistently prior to other signals. The rectangle 120 depicts the input image, characterized by spatial dimensions X,Y and luminance (e.g., brightness) L. In one or more implementations, the image luminance may be encoded into spike latency $\Delta t_i$ that is inversely proportional to the difference between the luminance of an area (e.g., one or more pixels) $L_i$ of the image, relative to a reference luminance $L_i$ as follows:

$$\Delta t_i \propto \frac{1}{|L_i - L_{ref}|}. \quad \text{(Eqn. 1)}$$

In some implementations, the reference luminance $L_{ref}$ may comprise average luminance 148 of the image 120, as shown in FIG. 1A. Other realizations of the reference luminance $L_{ref}$ may be employed, such as, for example, a media (background) luminance.

In some implementations, the spike latency $\Delta t_i$ may be determined with respect to one another (spike lag), or with respect to a reference event (e.g., an onset of a frame, an introduction of an object into a field of view, etc.).

In some implementations, the image luminance may be encoded into spike latency $\Delta t_i$ based on a logarithm of a function g( ) of the difference between the luminance $L_i$ and the reference luminance $L_{ref}$.

$$\Delta t_i \propto C - \log(g(L_i - L_{ref})). \quad \text{(Eqn. 2)}$$

where C is an offset. In some implementations, the function g may comprise a rectified generator function (e.g., a low pass filter) such as that described, for example, in co-owned and co-pending U.S. patent application Ser. No. 12/869,573, entitled "SYSTEMS AND METHODS FOR INVARIANT PULSE LATENCY CODING", filed Aug. 26, 2010, incorporated herein by reference in its entirety. The panel 140 in FIG. 1A depicts a map of neuron units associated, for example, with the spiking neuron network of the encoder 102 of FIG. 1. The horizontal axis of the panel 140 denotes the encoded latency, while the vertical axis denotes the number #N of a unit (e.g., the neurons 111) that may have generated spikes, associated with the particular latency value $\Delta t_i$.

The neuron group 112 depicts units 111 that may generate pulses with lower latency and, therefore, are the first to-respond to the input stimulus of the image 120. In accordance with Eqn. 1, dark and/or bright pixel areas 122, 128 within the image 120 may cause (as indicated by arrows 132, 138, respectively) the units within the group 112 to generate spikes, as indicated by the black triangles 111 in FIG. 1A. The unit groups 116, 114 may correspond to areas within the image that are characterized by smaller luminance deviation from the reference value (e.g., the areas 126, 124 as indicated by the arrows 136, 134, respectively in FIG. 1A). The neurons within the unit groups 114, 116 may remain inactive, as depicted by the open triangles 113, 115.

In some implementations, the detector block 108 of the apparatus 100 of FIG. 1 may include one or more units 144. The unit 144 may comprise logic configured to detect the winner units (e.g., the units 111 within the unit group 112). The detection may be based in part for instance on the unit 144 receiving the feed-forward output 146 from the units of the unit group 112. In some implementations, the detector unit accesses spike generation time table that may be maintained for the network of excitatory units 111, 113, 115. In one or implementations (not shown), the detection logic may be embedded within the units augmented by the access to the spike generation time table of the network.

In some configurations, such as the implementation of FIG. 1A, the units 111, 113, 115 may comprise an excitatory unit, and an inhibitory unit (e.g., the detector unit 144). The inhibitory unit(s) 144 may provide an inhibition indication to one or more excitatory units 111, 113, 115, such as via feedback connections (illustrated by the broken line arrows 110_1, 110_2 in FIG. 1A). In some implementations, the inhibition indication may be based on the unit 144 detecting early activity (the "winner") group among the unit groups responding to the image (e.g., the group 112 of the unit groups 112, 114, 116 in FIG. 1A). The inhibition indication may be used to prevent units within the remaining groups (e.g., groups 114, 116 in FIG. 1A) from responding to their stimuli (e.g., the image pixel areas 124, 126). Accordingly, inhibition of the remaining units within the network that is based on the detection the first-to-respond (i.e., winner) units effectuates a temporal winner-takes-all saliency detection functionality.

In some implementations, the feed-forward connections 146 from excitatory units 102 to the inhibitory unit 144 are characterized by an adjustable parameter, such as e.g., a synaptic connection weight $w^e$. In some implementations, the inhibitory feedback connections (e.g., the connections 110_1, 110_2 in FIG. 1A) may be characterized by a feedback connection weight w'. If desired, the synaptic weights $w^i$, $w^e$ may be adjusted using for instance spike timing dependent plasticity (STDP) rule, such as e.g., an inverse-STDP plasticity rule such as that described, for example, in a co-pending and co-owned U.S. patent application Ser. No. 13/465,924, entitled "SPIKING NEURAL NETWORK FEEDBACK APPARATUS AND METHODS", filed May 7, 2012 incorporated supra. In some implementations, the plasticity rule may comprise plasticity rule that is configured based on a target rate of spike generation (firing rate) by the excitatory units 102; one such implementation of conditional plasticity rule is described, for example, in U.S. patent application Ser. No. 13/541,531, entitled "CONDITIONAL PLASTICITY SPIKING NEURON NETWORK APPARATUS AND METHODS", filed Jul. 3, 2012, incorporated supra.

In some implementations, the inhibition indication may be determined based on spikes from one or more neurons within, for example, the group 112 in FIG. 1A, that may respond to spatially persistent (i.e., spatially salient) feature depicted by the pixels 122. The inhibition indication may also or alternatively be determined based on spikes from one or more neurons within, for example, the group 112 in FIG. 1A, that may respond to temporally persistent (i.e., temporally salient) feature, as illustrated in FIG. 2A below.

In one or more implementations, the excitatory units 111, 113, 115 may be operable in accordance with a dynamic and/or a stochastic unit process. In one such case, the unit response generation is based on evaluation of neuronal state, as described, for example in co-pending and co-owned U.S. patent application Ser. No. 13/465,924, entitled "SPIKING NEURAL NETWORK FEEDBACK APPARATUS AND METHODS", filed May 7, 2012, co-pending and co-owned U.S. patent application Ser. No. 13/540,429, entitled "SENSORY PROCESSING APPARATUS AND METHODS", filed Jul. 2, 2012, U.S. patent application Ser. No. 13/488,106, entitled "SPIKING NEURON NETWORK APPARATUS AND METHODS", filed Jun. 4, 2012, and U.S. patent application Ser. No. 13/488,114, entitled "LEARNING APPARATUS AND METHODS USING PROBABILISTIC SPIKING NEURONS.", filed Jun. 4, 2012, each of the foregoing incorporated herein by reference in its entirety.

Figure 3:
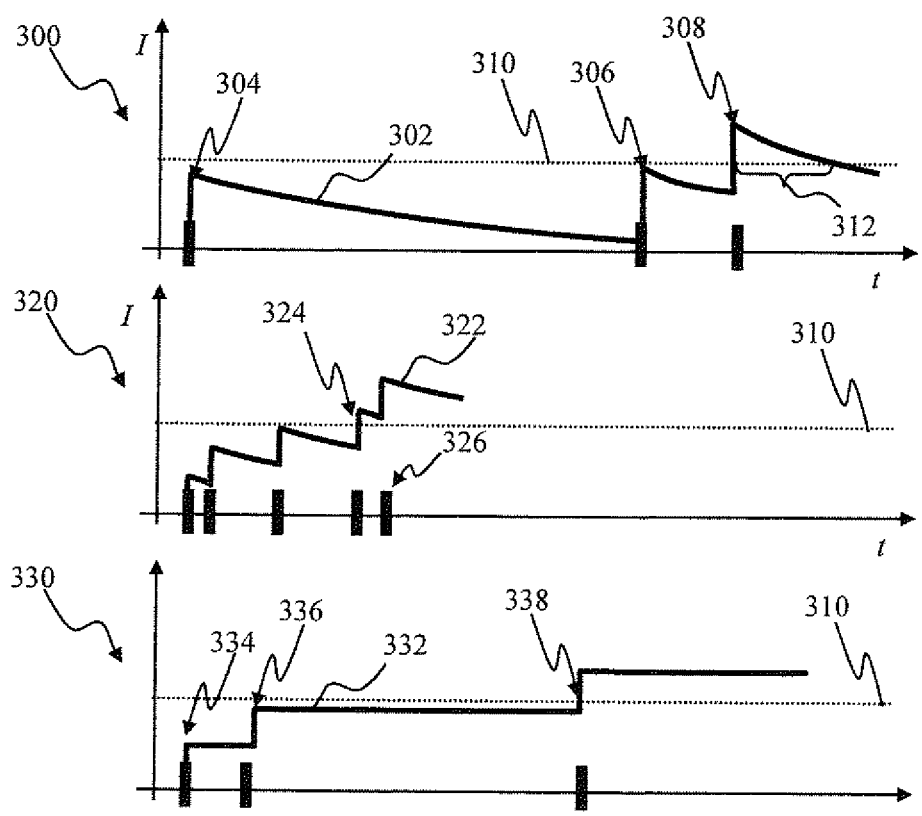
FIG. 3 is a graphical illustration depicting suppression of neuron responses to minor (background) features, in accordance with one implementation of the disclosure.

In one or more implementations, the inhibition indication may be determined based on one or more spikes generated by the 'winning' units (e.g., the units 111 of the group 112 in FIG. 1A), as illustrated in FIG. 3. The panel 300 of FIG. 3 depicts the time evolution of an inhibitory trace 302. The trace 302 may correspond far instance to a leaky integrate and fire spiking neuron process, such as e.g., that described in co-pending and co-owned U.S. patent application Ser. No. 13/487,533, entitled "STOCHASTIC SPIKING NETWORK LEARNING APPARATUS AND METHODS", Jun. 4, 2012, incorporated herein by reference in its entirety.

As illustrated in the panel 300, the inhibitory trace 302 is incremented (as shown by the arrows 304, 306, 308 in FIG. 3) each time an excitatory neuron generates an output, indicated by the vertical bars along the time axis of panel 300. The leaky nature of the neuron process causes the trace to decay with time in-between the increment events. In one implementation, the decay may be characterized by an exponentially decaying function of time. One or more inputs from the excitatory units may also cause the inhibitory trace 302 to rise above an inhibition threshold 310; the inhibitory trace that is above the threshold may cause for example a "hard" inhibition preventing any subsequent excitatory unit activity.

In some implementations (not shown) the excitatory neurons (e.g., the units 111, 113, 115 of FIG. 1A) comprise logic configured to implement inhibitory trace mechanism, such as, for example the mechanism of FIG. 3, described supra. In some implementations, the unit process associated with the excitatory units may be configured to incorporate the inhibitory mechanism described above. In one such case, the inhibitory connections (e.g., the connections 110 of FIG. 1A) may comprise parameters that are internal to the respective neuron, thereby alleviating the need for a separate inhibitory unit and/or inhibitory connections.

Figure 1B:
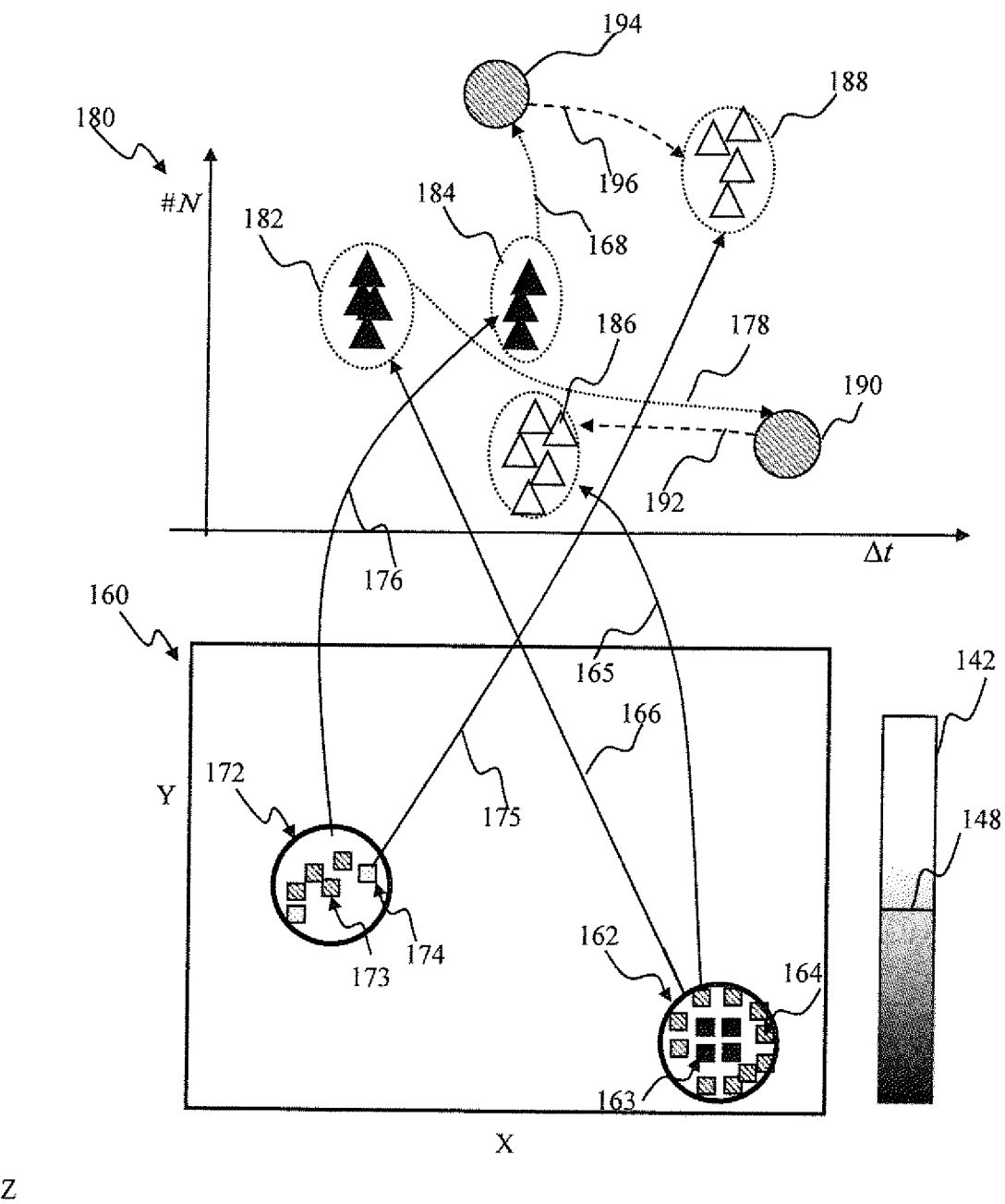
FIG. 1B is a graphical illustration of a temporal "winner takes all" contrast normalization mechanism in accordance with one implementation of the disclosure.

FIG. 1B illustrates one exemplary realization of local contrast enhancement using localized temporal WTA methodology. The rectangle in FIG. 1B 160 depicts the input image, characterized by spatial dimensions X,Y and luminance (e.g., brightness) L. In one or more implementations, the image luminance may be encoded into spike latency $\Delta t_i$ using, for example, methodology described above with respect to FIG. 1A.

The panel 180 in FIG. 1B depicts a map of neuron units associated, for example, with the spiking neuron network of the encoder 102 of FIG. 1. The horizontal axis of the panel 180 denotes the encoded latency, while the vertical axis denotes the number #N of a unit (e.g., the neurons 182, 184, 188) that may be configured to generate spikes associated with the respective area of the image 150 and at a particular latency value $\Delta t_i$.

The neuron group 182 depicts units that may generate pulses with lower latency and, therefore, are the first to-respond to the input stimulus of the image 160. In accordance with Eqn. 1, dark and/or bright pixels 163 within the pixel area 162 of the image 160 may cause (as indicated by arrow 166) the units within the group 182 to generate spikes, as indicated by the solid triangles 182 in FIG. 1B.

An indication related to the activity of the excitatory units 182 may be communicated (as shown by the dotted arrow 178 in FIG. 1B) to an inhibitory unit 190. The inhibitory unit 190 may be characterized by an area of influence (also referred to as the inhibition field) depicted by the curve 162 in FIG. 1B. Based on the activity indication 178, the inhibitory unit 190 may generate an inhibition signal, depicted by the broken arrow 192 in FIG. 1B. As the inhibitory activity of the unit 10 is localized to the area of influence 162, the inhibitory signal 192 is communicated to a portion of the units of the network (e.g., the unit group 186) that may be associated with the pixels of the area 162 in the image 160. Based on the inhibitory signal 192, the units 186 may remain inactive (as depicted by open triangles 186) in spite of receiving excitatory input from pixels 164 of the pixel area 162 in image 160 of FIG. 1B. The inactivity of the units 186 may be due to, at least partly, lower luminance of the pixels 164 compared to the pixels 163. As described, for example by Eqn. 1-Eqn. 2, pixels with lower luminosity (and/or lower color deviation from the mean) may be encoded into spokes with larger latency, as depicted by the horizontal position of the unit group 186 that is to the right (i.e., greater latency) of the horizontal position of the unit group 182 in FIG. 1B.

As the inhibitory influence of the unit 190 is localized (to e.g., the area 162) other features within the image may be encoded into spike output even when their brightness (e.g., pixels 173 of the area 172) may be comparable and/or lower compared to the suppressed pixels 164 of the area 162.

As shown in FIG. 1B, the feed-forward excitatory input of the pixels 173, 174 within the area 172 may be coupled to excitatory units 184 and 188, respectively. As the pixels 173 are brighter compared to the pixels 174, the latency of the network responses to these pixels is smaller compared to the latency associated with the pixels 174. Using the local temporal winner mechanism described above, the activity of the excitatory units 184 may be coupled (via connection 168) to another inhibitory unit 194 that is characterized by an inhibitory area denoted by the circle 172 in the panel 160 of FIG. 1B.

The unit 194 (e.g., pixels 173 of the area 172) may provide an inhibitory signal 196 to neurons 188 that may be configured to respond to pixels within the neuron inhibitory area of influence (e.g., the pixel area) 172. Based on the inhibitory input 196, the neurons within the groups 188 may remain inactive, as depicted by the open triangles 188.

Figure 2:
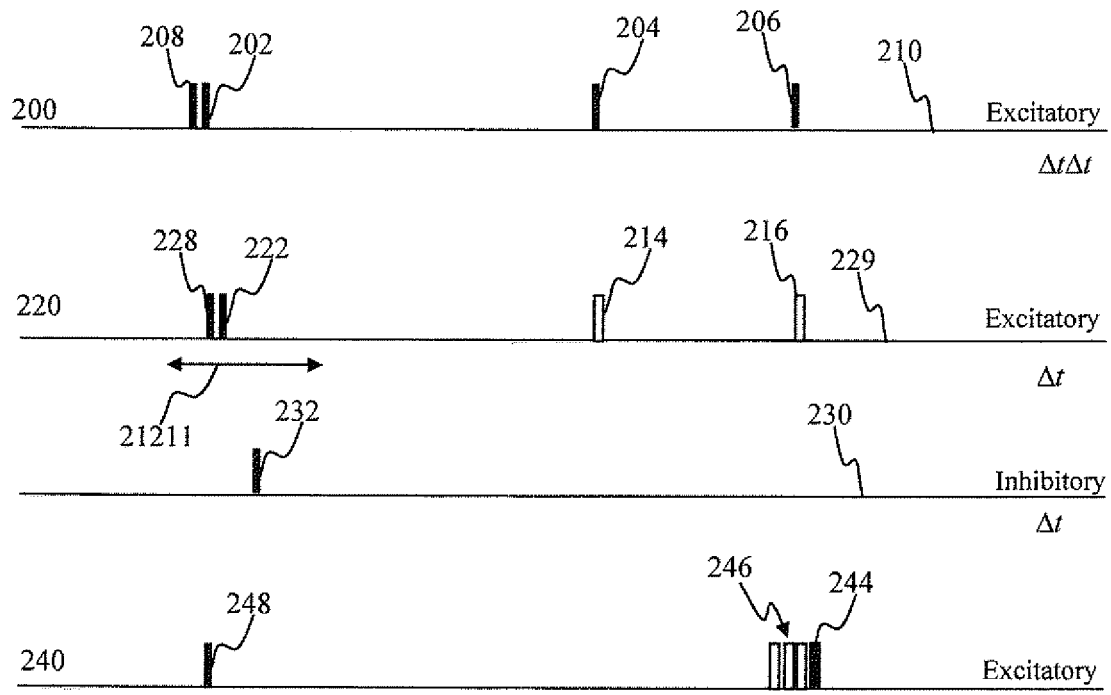
FIG. 2 is a graphical illustration depicting suppression of neuron responding to minor (background) features, in accordance with one implementation of the disclosure.
Figure 2A:
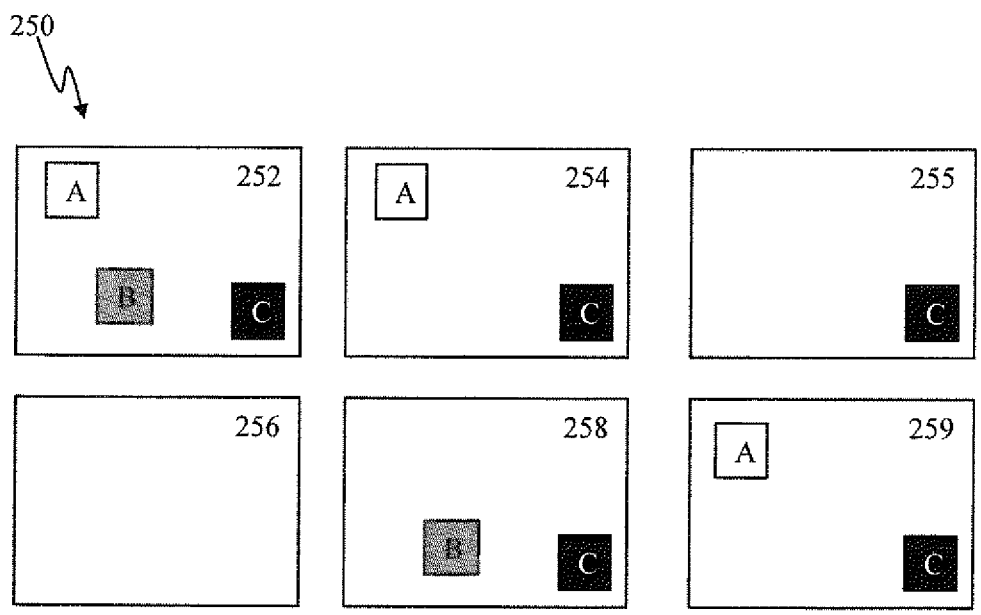
FIG. 2A is a graphical illustration depicting temporally salient feature detection, in accordance with one implementation of the disclosure.

FIG. 2 illustrates a response of a spiking neuron network, comprising the TWTA mechanisms of salient feature detection, in accordance with one or more implementations. The panel 200 of FIG. 2 depicts spikes generated by the units 102 in accordance with one typical mechanism of the prior art. The spikes, indicated by black rectangles denoted 202, 208, 204, 206 on the trace 210, are associated with the units of the groups 112, 118, 114, 116 of FIG. 1A, described above.

The panel 220 of FIG. 2 depicts spikes, indicated by black rectangles, 228, 222 generated by the excitatory units 102 in accordance with one implementation of the TWTA mechanism of the present disclosure. The spikes 222, 288 on the trace 229 are associated with the units of the groups 112, 118 of FIG. 1A, described above. The arrow 212 indicates a latency window that may be used for the early responder (winner) detection mechanism, described with respect to FIG. 1A above. The spike 232 on the trace 226 correspond to the inhibitory indication, such as e.g., that described with respect to FIG. 1A above. Comparing spike trains on the traces 210 and 229, the inhibitory spike 232 may prevent (suppress) generation of spikes 204, 206, as indicated by the blank rectangles 214, 216 on trace 229, at time instances corresponding to the spikes 204, 206 of the trace 210 in FIG. 2.

In some implementations, corresponding to the units generating a burst of spikes, the inhibitory signal (e.g., the spike 232 in FIG. 2) may suppress generation of some spikes within the burst. One such case is illustrated by panel 240 of FIG. 2, where the inhibitory signal may be configured to suppress some of the late fired spikes, while allowing a reduced fraction of the late spikes to be generated. In the implementation of the panel 240 of FIG. 2 (also referred to as the "soft" inhibition), one or more spikes of 246 the spike train are suppressed (as depicted by the blank rectangles) due to the inhibitory signal (e.g., the signal 232). However, one (or more) spikes 244 may persist.

The exemplary implementation of the winner-takes-all (WTA) mechanism illustrated in FIG. 1A may be referred to as a spatially coherent WTA, as the inhibitory signal may originate due to two or more "winner" units responding to a spatially coherent stimulus feature (e.g., the pixel groups 128, 122 in FIG. 1A). In some implementations, the WTA mechanism may be based on a temporally coherent stimulus, such as for example that described with respect to FIG. 2A. The frames 252, 254, 255, 256, 258, 259 shown in FIG. 2A may correspond for instance to a series of frames collected with a video and/or still image recording device (e.g., a camera) and/or a RADAR, or SONAR visualization. The frame series 250 can comprise representations of several features, in this example denoted 'A', 'B', 'C'. The feature C may be considered as the salient feature, as it persists throughout the sequence of frames 252, 254, 255, 258, 259. In some implementations, the salient feature may be missing from one of the frames (e.g., the frame 256 in FIG. 2A) due to, for example, intermittent signal loss, and/or high noise. The features 'A', 'B' may be considered as temporally not salient, as they are missing from several frames (e.g., the frames 254, 255, 258, 259) of the illustrator sequence 250. It is noteworthy, that a temporally non-salient feature of a frame sequence (e.g., the feature 'B' in FIG. 2A) may still be spatially salient when interpreted in the context of a single frame.

The exemplary WTA mechanism described with respect to FIGS. 1A-2A supra, is illustrated using a single aspect of the sensory input (e.g., a spectral illuminance parameter, such as brightness, of plate 120 of FIG. 1A. In some implementations, the WTA mechanism of the disclosure may advantageously combine two or more aspects of sensory input in order to facilitate salient feature detection. In one implementation, illustrated in FIG. 2B, some the sensory input may comprise a pixel array 260 (e.g., a visual, RADAR, and/or SONAR sensor output). The pixel aspects may comprise for instance a visual aspect (e.g., pixel contrast, shown by grayscale rectangles labeled 'A', 'B', 'C' in FIG. 2B). In some implementations, the other pixel aspects may comprise pixel motion (e.g., a position, a rate of displacement, and/or an acceleration) illustrated by arrows denoted 262, 264, 266 in FIG. 2B. The arrow 264 depicts coherent motion of object 'C', such as for example motion of a solid object, e.g., a car. The arrow groups 262, 264 depict in-coherent motion of the pixel groups, associated with the features such as for example clutter, false echoes, and/or birds.

Figure 2B:
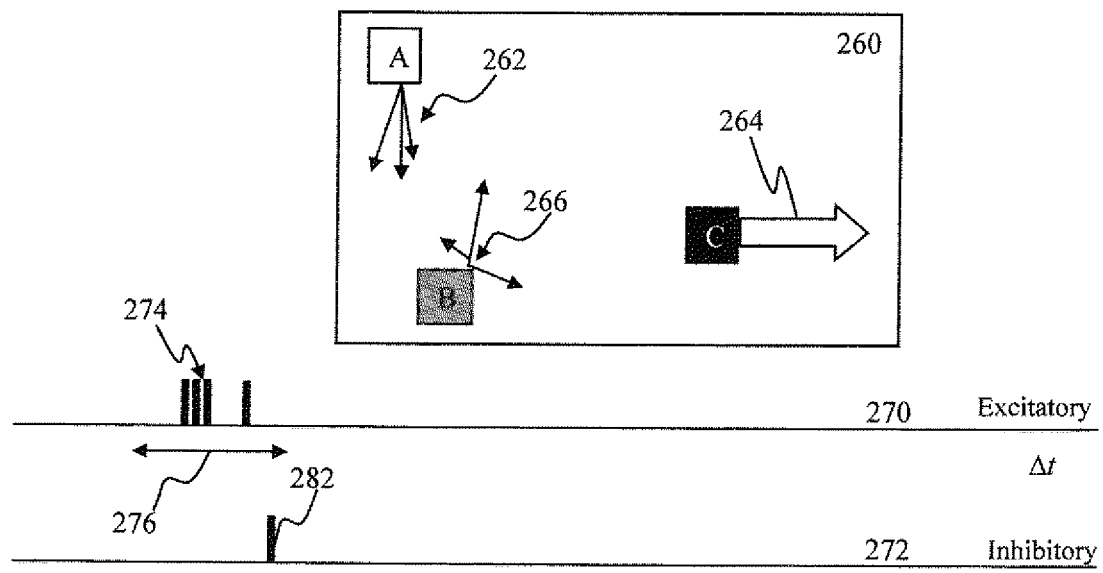
FIG. 2B is a graphical illustration depicting detection of spatially salient feature detection aided by encoding of multiple aspects of sensory stimulus, in accordance with one implementation of the disclosure.

In some implementations, spiking neuron network may be used to encode two (or more) aspects (e.g., color and brightness) of the input into spike output, illustrated by the trace 270 of FIG. 2B. The pulse train 274 may comprise two or more pulses 274 associated with the one or more aspects of the pixel array 260. Temporal proximity of the pulses 274, associated for example with the high contrast and coherent motion of the salient feature 'C', may cause an inhibitory spike 282. In some implementations, the inhibitory indication may prevent the network from generating a response to less noticeable features (e.g., the features 'A', 'B' in FIG. 2B). In one or more implementations (not shown), a spiking neuron network may be used to encode two (or more) modalities (visual and audio) of the input into a spike output.

Exemplary Methods

Salient Feature Detection

Figure 4A:
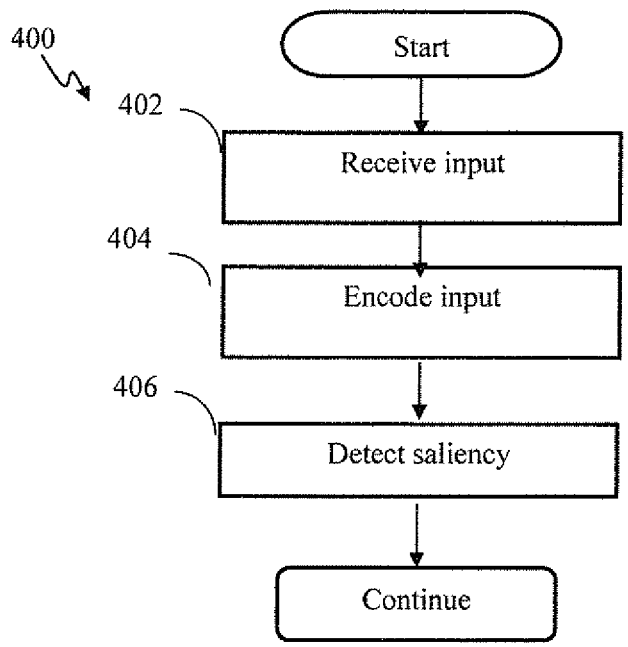
FIG. 4A is a logical flow diagram illustrating a generalized method of detecting salient features, in accordance with one implementation of the disclosure.

Referring now to FIG. 4A, an exemplary method of salient feature detection in sensory input in accordance with one or more implementations is shown and described.

At step 402 of the method 400 of FIG. 4A, input may be received by sensory processing apparatus (e.g., the apparatus 1000 shown and described with respect to FIG. 10A, below). In one or more implementations, the sensory input may comprise visual input, such as for example, ambient light 1062 received by a lens 1064 in a visual capturing device 1160 (e.g., telescope, motion or still camera, microscope, portable video recording device, smartphone), illustrated in FIG. 10B below. The visual input received at step 402 of method 400 may comprise for instance an output of an imaging CCD or CMOS/APS array of the device 1080 of FIG. 10B. In one or more implementations, such as, for example, processing apparatus 1070 configured for processing of digitized images in e.g., portable video recording and communications device) described with respect to FIG. 10B, below, the visual input of FIG. 4A may comprise digitized frame pixel values (RGB, CMYK, grayscale) refreshed at a suitable rate. The visual stimulus may correspond to an object (e.g., a bar that may be darker or brighter relative to background), or a feature being present in the field of view associated with the image generation device. The sensory input may alternatively comprise other sensory modalities, such as somatosensory and/or olfactory, or yet other types of inputs as will be recognized by those of ordinary skill given the present disclosure.

At step 404, the sensory input is encoded using for example latency encoding mechanism described supra.

At step 406, sensory input saliency is detected. In one or more implementations of visual input processing, saliency detection may comprise detecting features and/or objects that are brighter and/or darker compared to a background brightness and/or average brightness. Saliency detection may comprise for instance detecting features and/or objects that have a particular spectral illuminance characteristic (e.g., color, polarization) or texture, compared of an image background and/or image average.

Figure 4B:
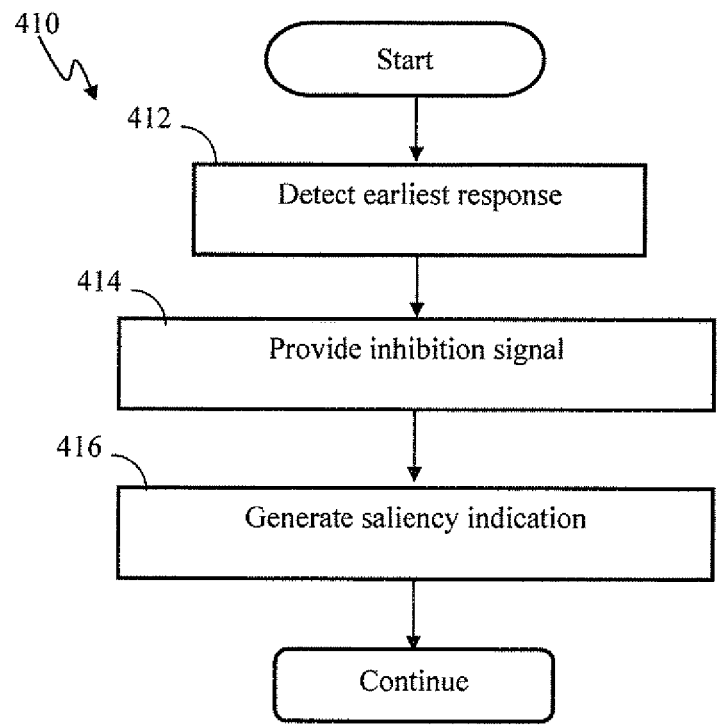
FIG. 4B is a logical flow diagram illustrating a method of detecting salient features based on an inhibition of late responding units, in accordance with one implementation of the disclosure.

FIG. 4B illustrates an exemplary method of detecting salient features based on an inhibition of late responding units for use, for example, with the method 400 of FIG. 4A. In one or more implementations, the method is effectuated in a spiking neuron network, such as, for example the network 140 of FIG. 1A, and/or network 1025 of FIG. 10A, described below, although other types of networks may be used with equal success.

At step 412 of method 410 of FIG. 4B, an initial response of neuron network units is detected. In one or more implementations, the detection may comprise a latency parameter, such as the latency window 212 described with respect to FIG. 2 supra.

At step 414 of method 410, an inhibition signal is generated. The inhibition signal may be based, at least partly, on the initial response detection of step 412. In one or more implementations, the inhibition signal may be generated by an inhibitory neuron configured to receive post-synaptic feed-forward responses from one or more units, such as, for example the inhibitory neuron 1040, receiving output (e.g., post-synaptic responses) from units 1022 of FIG. 10A.

In one or more implementations, the inhibition signal may cause reduction and/or absence of subsequent post-synaptic responses by the remaining units within the network, thereby enabling the network to provide saliency indication at step 416. In some implementations, the saliency indication may comprise a frame number (and/or (x,y) position within the frame) of an object and/or feature associated with the spikes that made it through the WTA network. The saliency indication may be used, for example, to select frames comprising the salient object/feature and/or shift (e.g., center) lens field of view in order to afford a fuller coverage of the object/feature by the lens field of view.

Figure 4C:
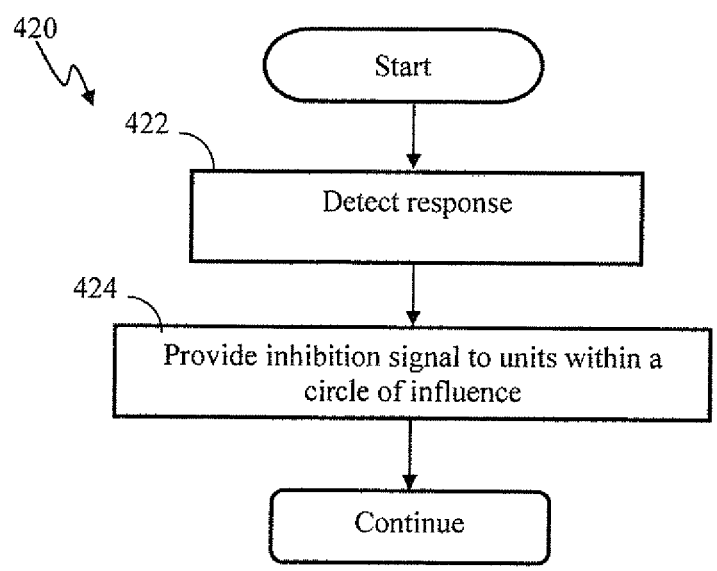
FIG. 4C is a logical flow diagram illustrating a method of providing local inhibition, in accordance with one implementation of the disclosure.

FIG. 4C illustrates an exemplary method of local inhibition of late responding units for use, for example, with the methods 400, 410 of FIGS. 4A-4B, respectively. In one or more implementations, the method 420 of FIG. 4C may be effectuated by a spiking neuron network, such as, for example the network 180 of FIG. 1B, and/or network 1025 of FIG. 10A, described below, although other types of networks may be used with equal success.

At operation 422 of method 420 of FIG. 4C, a response of neuron network units is detected. In one or more implementations, the detection may comprise a latency parameter, such as the latency window 212 described with respect to FIG. 2 supra.

At operation 424 of method 420, an inhibition signal is generated. The inhibition signal may be based, at least partly, on the initial response detection of step 422. In one or more implementations, the inhibition signal may be generated by an inhibitory neuron configured to receive post-synaptic feed-forward responses from one or more units, such as, for example the inhibitory neuron 194 of FIG. 1B, receiving output (e.g., feed-forward responses) from units 184 of FIG. 1B and/or inhibitory neuron 1040, receiving output (e.g., post-synaptic responses) from units 1022 of FIG. 10A.

In one or more implementations, the inhibition signal may cause reduction and/or absence of subsequent post-synaptic responses by other units (e.g., the units 188 in FIG. 1B) within the inhibitory area of influence of the respective given inhibitory neuron (e.g., the neuron 194 in FIG. 1B). In some implementations, the local inhibition of operation 424 may be used to increase local contrast, as described in detail with respect to FIG. 9C, below. In some implementations, the local inhibition of operation 424 may enable encoding of secondary (less pronounced) features, such as for example, the pixels 173 of FIG. 1B.

Figure 5:
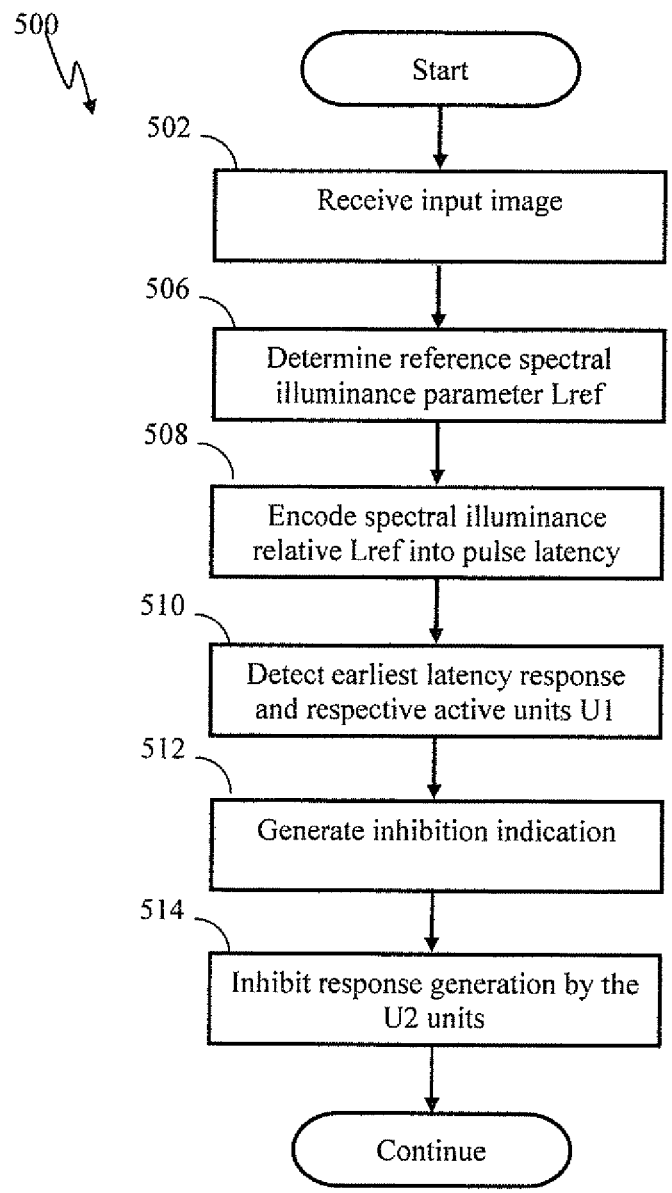
FIG. 5 is a logical flow diagram illustrating a method of detecting salient features in visual input using latency based encoding, in accordance with one implementation of the disclosure.

FIG. 5 illustrates one exemplary method of detecting salient features in visual input using latency based encoding, in accordance with one or more implementations.

At step 502 of the method 500 of FIG. 5, an input image is received. In some implementations, the image may comprise output of imaging CMOS/APS array of a video capturing device (e.g., the device 1080 of FIG. 10B). In one or more implementations, such as, for example, processing apparatus 1070 configured for processing of digitized images in e.g., portable video recording and communications device) described with respect to FIG. 10B, below, the input image may comprise digitized frames of pixel values (ROB, CMYK, grayscale) refreshed at suitable rate.

At step 506, a reference parameter (e.g., spectral illuminance parameter $L_{ref}$) of the image may be determined. In one or more implementations, the parameter $L_{ref}$ may comprise image average and/or image background brightness, or dominant and/or image background color.

At step 508, the image is encoded. The encoding may comprise for example encoding image brightness difference to the reference brightness $L_{ref}$ into pulse latency. In some implementations, the latency encoding may be effectuated for example using Eqn. 1 herein, although other approaches may be used as well.

At step 510, the earliest responses of one or more network units U1 may be detected. In one or more implementations, the detection may comprise a latency parameter, such as the latency window 212 described with respect to FIG. 2 supra.

At step 512, an inhibition signal is generated. In one or more implementations, the inhibition signal may be based, at least partly, on the initial response detection of step 510. The earliest latency response detection may be provided to a designated inhibitory network unit, such as, for example the unit 1040 in FIG. 10A. The earliest latency response detection may also comprise post-synaptic feed-forward response generated by the neuronal units responsive to feed-forward sensory stimulus. In one such implementation, the inhibition signal may be generated by the inhibitory neuron configured to receive post-synaptic feed-forward responses from one or more units, such as, for example the inhibitory neuron 1040, receiving output (e.g., post-synaptic responses) from units 1022 of FIG. 10A. In some implementations, the inhibition indication may be generated internally by the network units based on information related to prior activity of other units (e.g., the earliest latency response detection indication).

At step 514, responses of the remaining population of the network units (i.e., the units whose responses have not been detected at step 510) are inhibited, i.e. prevented from responding.

Network Unit Operation

Figure 6:
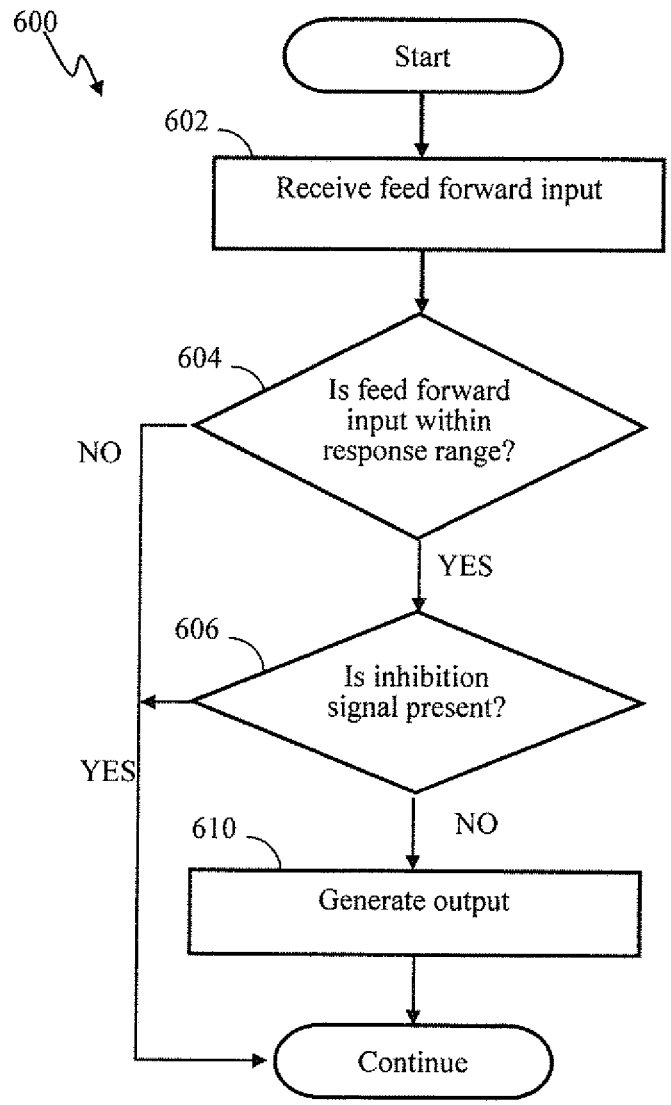
FIG. 6 is a logical flow diagram illustrating a method of operating a spiking network unit for use with salient feature detection method of FIG. 4A, in accordance with one implementation of the disclosure.

FIG. 6 is a logical flow diagram illustrating a method of operating a spiking network unit (e.g., the unit 1022 of FIG. 10A) for use with the salient feature detection method of FIG. 4A, in accordance with one or more implementations.

At step 602, a feed-forward input is received by the unit. In some implementations, the feed-forward input may comprise sensory stimulus 1002 of FIG. 10A.

At step 604, the state of the unit may be evaluated in order to determine if the feed-forward input is sufficient (i.e., is within the unit input range) to cause post-synaptic response by the unit. In some implementations, the feed forward input may comprise a pattern of spikes and the unit post-synaptic response may be configured based on detecting the pattern within the feed-forward input.

If the feed-forward input is sufficient to cause post-synaptic response by the unit, the method proceeds to step 606, where a determination may be performed whether the inhibition signal is present. If the inhibition signal is not present, the unit may generate an output (a post-synaptic response) at step 610.

In one or more implementations, the unit may be operable in accordance with a dynamic and/or a stochastic unit process. In one such implementation, the operations of steps 604, 606 may be combined. Accordingly, the unit response generation may be based on evaluation of neuronal state, as described, for example in co-pending and co-owned U.S. patent application Ser. No. 13/465,924, entitled "SPIKING NEURAL NETWORK FEEDBACK APPARATUS AND METHODS", filed May 7, 2012, co-pending and co-owned U.S. patent application Ser. No. 13/540,429, entitled "SENSORY PROCESSING APPARATUS AND METHODS", filed Jul. 2, 2012, U.S. patent application Ser. No. 13/488,106, entitled "SPIKING NEURON NETWORK APPARATUS AND METHODS", filed Jun. 4, 2012, and U.S. patent application Ser. No. 13/488,114, entitled "LEARNING APPARATUS AND METHODS USING PROBABILISTIC SPIKING NEURONS.", filed Jun. 4, 2012, each of the foregoing incorporated supra.

Image Processing

Figure 7A:
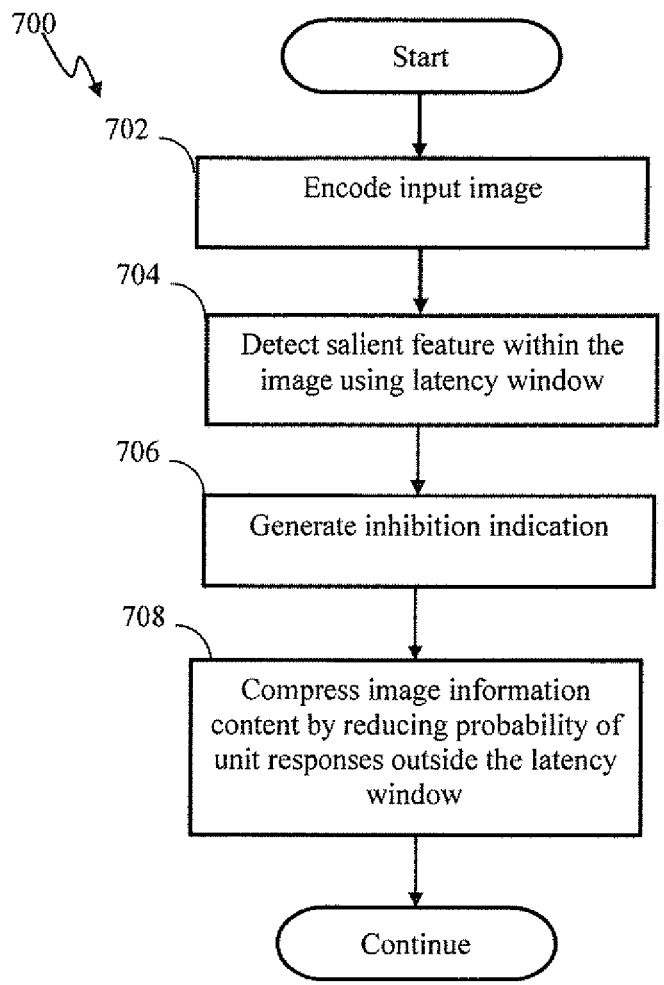
FIG. 7A is a logical flow diagram illustrating a method of image compression using salient feature detection, in accordance with one implementation of the disclosure.
Figure 7B:
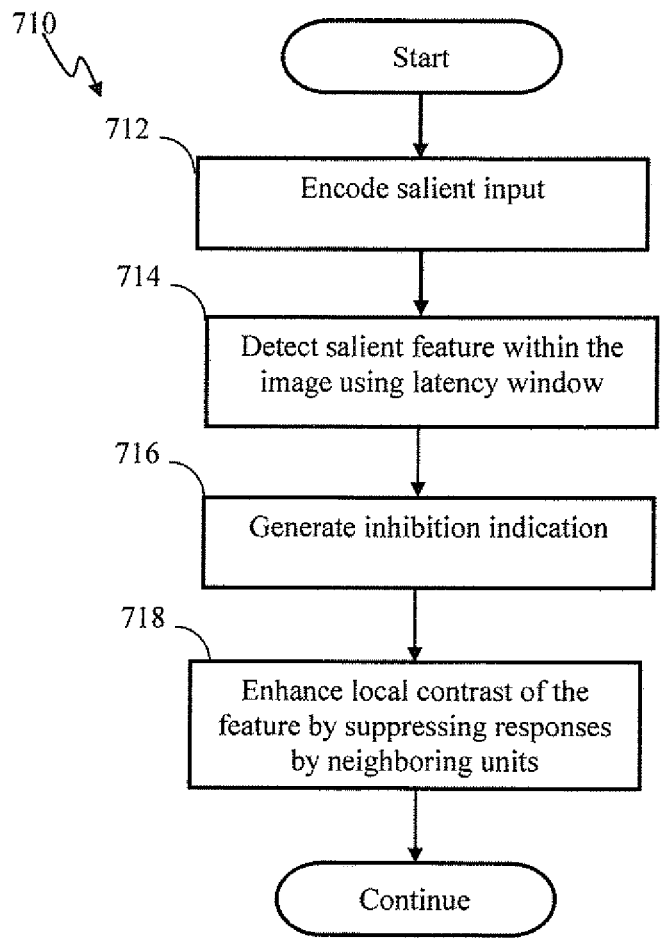
FIG. 7B is a logical flow diagram illustrating a method of contrast enhancement, in accordance with one implementation of the disclosure.
Figure 8:
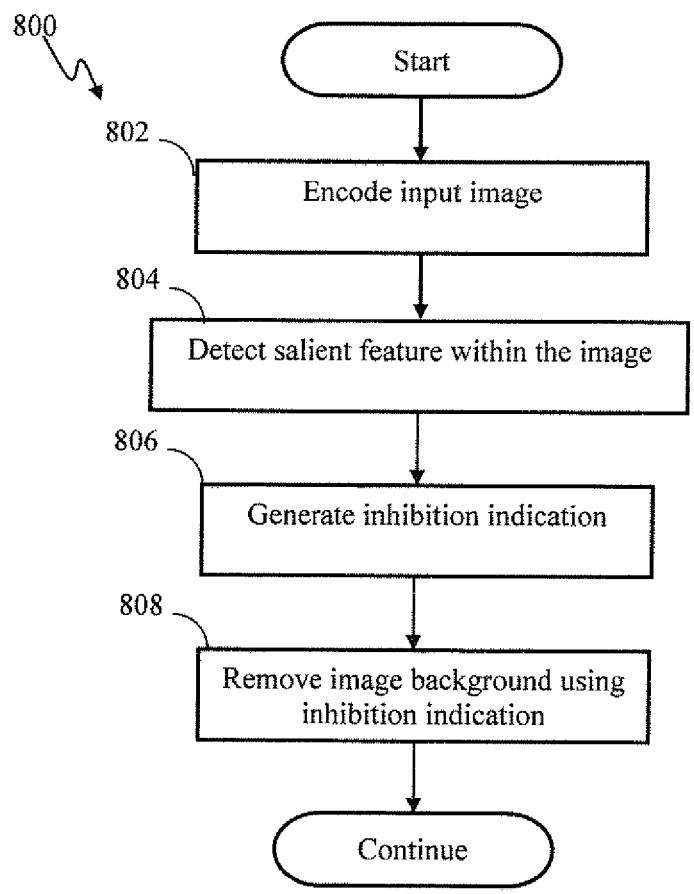
FIG. 8 is a logical flow diagram illustrating a method of detecting salient features based on an inhibition of late responding neurons, in accordance with one implementation of the disclosure.

FIGS. 7A-8 illustrate exemplary methods of visual data processing comprising the salient feature detection functionality of various aspects of the invention. In one or more implementations, the processing steps of methods 700, 710, 800 of FIGS. 7A-8, respectively, may be effectuated by the processing apparatus 1000 of FIG. 10A, described in detail below, e.g., by a spiking neuron network such as, for example, the network 1025 of FIG. 10A, described in detail below.

At step 702 of method 700 of FIG. 7A (illustrating exemplary method of image compression), in accordance with one or more implementations, the input image may be encoded using, for example, latency encoding described supra. The salient feature detection may be based for instance at least in part on a latency window (e.g., the window 212 of FIG. 2 above).

At step 704, one or more salient features (that may be present within the image) are detected. In some implementations, the salient feature detection may comprise the method 410 of FIG. 4B, described above.

At step 706 of method 700, an inhibition indication is generated. In one or more implementations, the inhibition signal may be based, at least partly, on the initial response detection of step 704. The inhibition signal may be generated for instance by an inhibitory neuron configured to receive post-synaptic feed-forward responses from one or more units, such as, for example the inhibitory neuron 1040, receiving output (e.g., post-synaptic responses) from units 1022 of FIG. 10A.

At step 708, the inhibition indication is used to reduce a probability of unit response(s) that are outside the latency window. The window latency is configured for example based on maximum relevant latency. In some implementations, the maximum relevant latency may correspond to minimum contrast, and/or minimum brightness within the image. Inhibition of unit responses invariably reduces the number of spikes that are generated by the network in response to the stimulus input image. Accordingly, the spike number reduction may effectuate image compression. In some implementations, the compressed image may comprise the initial unit responses (i.e., the responses used at step 704 of method 700) that fall within the latency window. The compressed image may be reconstructed using e.g., random and/or preset filler in information (e.g., background of a certain color and/or brightness) in combination with the salient features within the image.

FIG. 7B-8 illustrates exemplary method of local contrast enhancement according to the disclosure.

At step 712 of method 710 of FIG. 7B the salient input within the image may be encoded using, for example, latency encoding described supra.

At step 714, one or more salient features (that may be present within the image) are detected. The salient feature detection may be based for instance on a latency window (e.g., the window 212 of FIG. 2 above). In some implementations, the salient feature detection may comprise the method 410 of FIG. 4B, described above.

At step 716 of method 710, an inhibition indication is generated. In one or more implementations, the inhibition signal may be based, at least partly, on the initial response detection of step 714. The inhibition signal may be generated for instance by an inhibitory neuron configured to receive post-synaptic feed-forward responses from one or more units, such as, for example the inhibitory neuron 194, receiving output (e.g., post-synaptic responses) from units 184 of FIG. 1B. The inhibitory neuron may be characterized by an area of influence (e.g., units responding to the pixel area 172 in FIG. 1B).

At step 718, the inhibition indication is used to reduce a number of responses and/or probability of response(s) by units within the area of inhibition subsequent to the latency window used at step 714. While the salient feature (e.g., the pixels 173 in FIG. 1B) may cause unit responses, unit responses to less pronounced features (e.g., pixels 174) that may surround the salient feature may be suppressed (inhibited). Such inhibition may remove feature 'halo' and or ghosting, thereby increasing the contrast that may be characterized between a difference between luminance of the salient feature pixels (e.g., 173) and the background luminance. In some implementations, the contract enhancement may be based on color and/or other pixel parameter(s).

FIG. 8 illustrates an exemplary method of image background removal using the salient feature detection methodology described herein.

At step 802 of method 800, the input image is encoded using, for example, latency encoding described supra. In one or more implementations, the salient feature detection is based at least in part on a latency window (e.g., the window 212 of FIG. 2 above).

At step 804, one or more salient features (that may be present within the image) are detected, such as via the method of FIG. 4A, described above.

At step 806 of method 800, an inhibition indication is generated. In one or more implementations, the inhibition signal may be based, at least partly, on the initial response detection of step 804, and generated by an inhibitory neuron configured to receive post-synaptic feed-forward responses from one or more units, such as, for example the inhibitory neuron 1040, receiving output (e.g., post-synaptic responses) from units 1022 of FIG. 10A.

At step 808, the inhibition indication is used to reduce a probability of unit responses that are outside the latency window. The window latency is configured based on e.g., maximum relevant latency. In some implementations, the maximum relevant latency may correspond to minimum contrast, and/or minimum brightness within the image. Inhibition of unit responses may eliminate unit output(s) (i.e., the spikes) that may be generated by the network in response to the stimulus of the input image that corresponds to the image background. Accordingly, the network output may comprise spikes associated with salient features within the image and not with the image background. In some implementations, the original image may be reconstructed using arbitrary and/or pre-determined background (e.g., background of a certain color and/or brightness) in combination with the salient features within the processed image.

In one or more implementations, the inhibition may be confined to an area proximate to the inhibitory neuron, thereby effectuating a localized inhibition. Such localized inhibition may be utilized in order to remove unwanted (non-salient) features (e.g., pixels 164 in FIG. 1B) within the inhibitory area (e.g., the area 162) of the image associated with the salient feature (e.g., the pixels 162 in FIG. 1B), while preserving other salient features (e.g., the pixels 173) that may be present. In one such implementation, the localized inhibition may be utilized to enhance the contrast of an image comprising two portions of different contrast (e.g., one having an object illuminated in a full sun, and another having an object in the shade). The second object, located in (partial) shade may appear less bright and may be erroneously interpreted as less salient by a conventional WTA mechanism. The localized contrast enhancement described herein may, advantageously, allow background removal in two portions of the image, while preserving both objects (e.g., one in full sun and one in the partial shade).

The background removal may advantageously be used for removal of noise (i.e., portions of the image that are not pertinent to the feature being detected). The noise removal may produce an increase in signal to noise ratio (SNR), thereby enabling improved detection of salient features within the image.

Exemplary Processing Apparatus

Various exemplary spiking network apparatus comprising the saliency detection mechanism of the disclosure are described below with respect to FIGS. 10A-11C.

Spiking Network Sensory Processing Apparatus

One apparatus for processing of visual information using salient feature detection as described above is illustrated in FIG. 10A. In one or more implementations, the apparatus 1000 comprises an encoder 1010 that may be configured to receive input signal 1002. In some applications, such as, for example, artificial retinal prosthetic, the input 1002 may be a visual input, and the encoder 1010 may comprise one or more diffusively coupled photoreceptive layer as described in U.S. patent application Ser. No. 13/540,429, entitled "SENSORY PROCESSING APPARATUS AND METHODS", incorporated supra. The visual input may comprise for instance ambient visual light captured through, inter alia, an eye lens. In some implementations, such as for example encoding of light gathered by a lens 1064 in visual capturing device 1060 (e.g., telescope, motion or still camera) illustrated in FIG. 10B, the visual input comprises ambient light stimulus 1062 captured by, inter alia, device lens 1064. In one or more implementations, such as, for example, an encoder 1076 configured for processing of digitized images a processing apparatus 1070 described with respect to FIG. 10B below, the sensory input 1002 of FIG. 10A comprises digitized frame pixel values (RGB, CMYK, grayscale) refreshed at suitable rate, or other sensory modalities (e.g., somatosensory and/or gustatory).

Figure 10A:
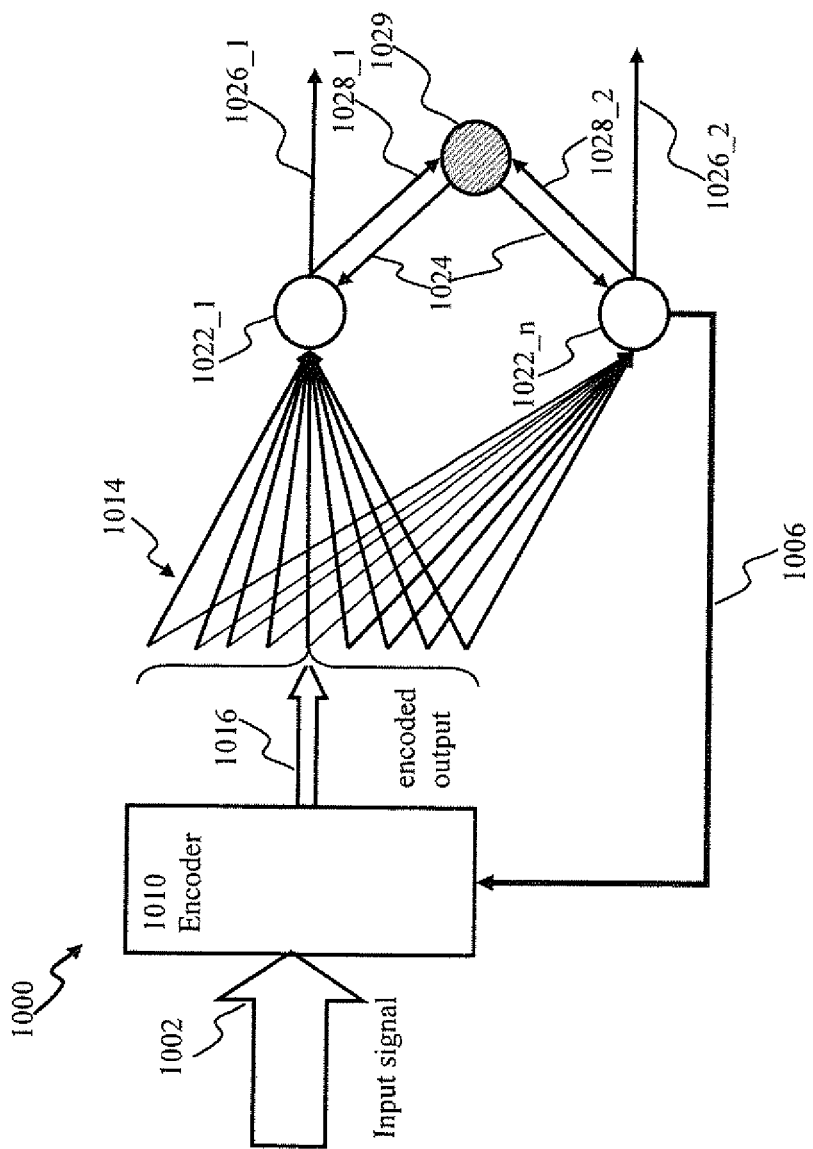
FIG. 10A is a block diagram illustrating a visual processing apparatus comprising salient feature detector apparatus configured in accordance with one or more implementations.
Figure 10B:
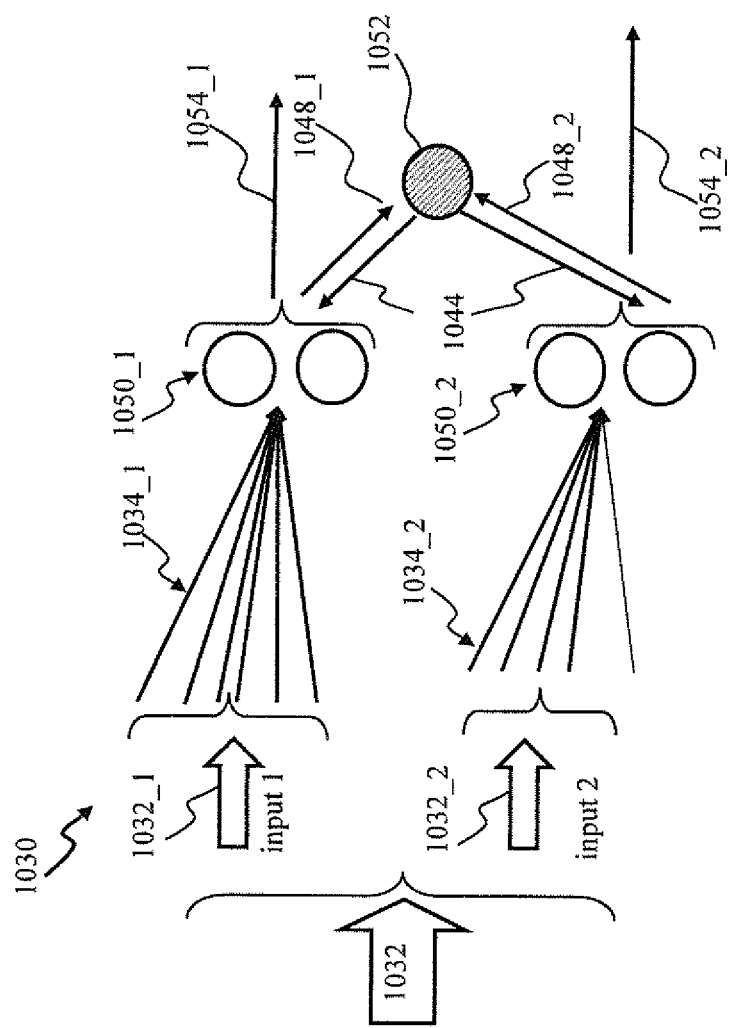
FIG. 10B is a block diagram illustrating a visual processing apparatus comprising encoding of two sensory inputs configured to facilitate salient feature detection, in accordance with one or more implementations of the disclosure.

The input may comprise light gathered by a lens of a portable video communication device, such as the device 1080 shown in FIG. 10B. In one implementation, the portable device may comprise a smartphone configured to process still and/or video images using diffusively coupled photoreceptive layer described in the resent disclosure. The processing may comprise for instance image encoding and/or image compression, using for example processing neuron layer. In some implementations, encoding and/or compression of the image may be utilized to aid communication of video data via remote link (e.g., cellular, Bluetooth, Wi-Fi, LTE, etc.), thereby reducing bandwidth demands on the link.

In some implementations, the input may comprise light gathered by a lens of an autonomous robotic device (e.g., a rover, an autonomous unmanned vehicle, etc.), which may include for example a camera configured to process still and/or video images using, inter alia, one or more diffusively coupled photoreceptive layers described in the aforementioned referenced disclosure. In some implementations, the processing may comprise image encoding and/or image compression, using for example processing neuron layer. For instance, higher responsiveness of the diffusively coupled photoreceptive layer may advantageously be utilized in rover navigation and/or obstacle avoidance.

It will be appreciated by those skilled in the art that the apparatus 1000 may be also used to process inputs of various electromagnetic wavelengths, such as for example, visible, infrared, ultraviolet light, and/or combination thereof. Furthermore, the salient feature detection methodology of the disclosure may be equally useful for encoding radio frequency (RF), magnetic, electric, or sound wave information.

Returning now to FIG. 10A, the input 1002 may be encoded by the encoder 1010 using, inter alia, spike latency encoding mechanism described by Eqn. 1.

In one implementation, such as illustrated in FIG. 10A, the apparatus 1000 may comprise a neural spiking network 1025 configured to detect an object and/or object features using, for example, context aided object recognition methodology described in U.S. patent application Ser. No. 13/488,114, filed Jun. 4, 2012, entitled "SPIKING NEURAL NETWORK OBJECT RECOGNITION APPARATUS AND METHODS", incorporated herein by reference in its entirety. In one such implementation, the encoded signal 1012 may comprise a plurality of pulses (also referred to as a group of pulses), transmitted from the encoder 1010 via multiple connections (also referred to as transmission channels, communication channels, or synaptic connections) 1014 to one or more neuron units (also referred to as the detectors) 1022 of the spiking network apparatus 1025. Although only two detectors (1022_1, 1022_n) are shown in the implementation of FIG. 10A for clarity, it is appreciated that the encoder 1010 may be coupled to any number of detector nodes that may be compatible with the apparatus 1000 hardware and software limitations. Furthermore, a single detector node may be coupled to any practical number of encoders.

In one implementation, the detectors 10221, 1022_n may contain logic (which may be implemented as a software code, hardware logic, or a combination of thereof) configured to recognize a predetermined pattern of pulses in the signal 1012, using any of the mechanisms described, for example, in the U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", to produce post-synaptic detection signals transmitted over communication channels 1026.

In one implementation, the detection signals may be delivered to a next layer of the detectors (not shown) for recognition of complex object features and objects, similar to the description found in commonly owned U.S. patent application Ser. No. 13/152,119, filed Jun. 2, 2011, entitled "SENSORY INPUT PROCESSING APPARATUS AND METHODS". In this implementation, each subsequent layer of detectors may be configured to receive signals from the previous detector layer, and to detect more complex features and objects (as compared to the features detected by the preceding detector layer). For example, a bank of edge detectors may be followed by a bank of bar detectors, followed by a bank of corner detectors and so on, thereby enabling alphabet recognition by the apparatus.

The output of the detectors 1022 may also be provided to one or more inhibitory units 1029 via feed-forward connections 1028. The inhibitory unit 1029 may contain logic (which may be implemented as a software code, hardware logic, or a combination of thereof) configured to detect the first responders among the detectors 1022. In one or more implementations, the detection of the first-to respond detectors is effectuated using a latency window (e.g., the window 212 in FIG. 2). In some cases (for example when processing digital image frames), the onset of the latency window may be referenced to the onset of the input frame. The latency window may also be referenced to a lock and/or an event (e.g., a sync strobe). In one or more implementations, the window latency may be configured based on maximum relevant latency. The maximum relevant latency may correspond for example to minimum contrast, and/or minimum brightness within the image. Inhibition of unit responses may eliminate unit output (i.e., the spikes) that are may be generated by the network in response to the stimulus of the input image that corresponds to the image background. The first to respond units may correspond for example to the units 102 of the unit group 112 of FIG. 1 responding to a salient feature within the input 1002.

The inhibitory units may provide inhibitory indications to the detectors 1022 via the feedback connections 1024. The inhibition indication may be based, at least partly, on e.g., the detection of the first-to-respond unit(s) and characterized by the response time $t_{sal}$. In one or more implementations, the inhibition indication may cause a reduction of probability of responses being generated by the units 1022, subsequent to the response time $t_{sal}$. Accordingly, the network output 1026 may comprise spikes associated with salient features within the image. In some implementations, the output 1026 may not contain spikes associated with image background and/or other not salient features, thereby effectuating image compression and/or background removal. The original image may also be reconstructed from the compressed output using for example arbitrary and/or pre-determined background (e.g., background of a certain color and/or brightness) in combination with the salient features within the processed image.

The sensory processing apparatus implementation illustrated in FIG. 10A may further comprise feedback connections 1006. In some variants, connections 1006 may be configured to communicate context information as described in detail in U.S. patent application Ser. No. 13/465,924, entitled "SPIKING NEURAL NETWORK FEEDBACK APPARATUS AND METHODS", filed May 7, 2012, incorporated supra.

In some implementations, the network 1025 may be configured to implement the encoder 1010.

FIG. 10B illustrates an exemplary spiking neuron network processing apparatus configured to encode two sensory input attributes.

The apparatus 1030 may comprise one or more encoders configured to receive sensory input 1032. In some visual processing applications, the input may comprise visual input composed of two or more channels characterizing two or more aspects of the input (e.g., chromaticity and luminance). In one or more sensory processing applications, the inputs 1032_1, 1032_2 may comprise two or more modalities (e.g., visual and audio). In one or more remote sensing applications, the inputs 1032_1, 1032_2 may comprise two or more sensor inputs (e.g., infrared, visual, radio frequency, sound, X-ray, and or other signals).

The encoded input may comprise a plurality of pulses that may be communicated to banks of detectors 1050_1, 1050_2 via connections 1034_1, 1034_2. Although for reasons of clarity only two detectors per bank (1050_1, 1050_2) are shown in the implementation of FIG. 10B, it is appreciated that the encoder of the apparatus 1030 may be coupled to any number of detectors and/or detector banks that may be compatible with hardware and software resources of the apparatus 1030. Furthermore, a single detector may be coupled to any practical number of encoders.

In one implementation, the detectors 1050_1, 1050_2 may contain logic (which may be implemented as a software code, hardware logic, or a combination of thereof) configured to recognize a predetermined pattern of pulses in the signals 1012, using any of the mechanisms described above. The detectors 1050_1, 1050_2 may be configured to produce detection signals (e.g., post-synaptic responses) which are delivered over the communication channels 1054_1, 1054_2.

In one implementation, the detection signals 1054_1, 1054_2 may be combined at a subsequent layer of the detectors (not shown) for recognition of complex object features and objects based on information contained in both sensory inputs 1032. Exemplary architectures and techniques for complex object feature recognition are described in co-pending and co-owned U.S. patent application Ser. No. 13/465,903, entitled "SENSORY INPUT PROCESSING APPARATUS AND METHODS IN A SPIKING NEURAL NETWORK", filed May 7, 2012, the foregoing being incorporated herein by reference in its entirety. Although, it will be appreciated that other systems and techniques may be substituted.

The output of the detectors 1050 may also be provided to one or more inhibitory units 1052 via the feed-forward connections 1048. The inhibitory unit 1052 may contain logic (which may be implemented as a software code, hardware logic, or a combination of thereof) configured to detect the first-to respond detectors 1050. In one or more implementations, the detection of the first-to respond detectors may be effectuated using a latency window (e.g., the window 212 in FIG. 2). In some implementations, the onset of the latency window may be referenced to the onset of the input frame. The latency window may also be referenced to a hardware/software lock (e.g., a sync strobe) and/or another event. This referencing of the latency window may be used in applications such as the processing of digital image frames. In one or more implementations, the window latency may be configured based on the maximum relevant latency. The maximum relevant latency may correspond, for example, to the minimum contrast, and/or the minimum brightness within the image. Inhibition of unit responses may eliminate unit output (i.e., the spikes) that is generated by the network in response to the image background. The first-to respond units may correspond, for example, to the units 102 of the unit group 112 of FIG. 1 responding to a salient feature within the input 1032.

The inhibitory units 1052 may provide inhibitory signal to the detectors 1050 via the feedback connections 1044. The inhibition indication may be based, at least partly, on the detection of the first-to-respond unit(s) and may be characterized by the response time $t_{sal}$. In one or more implementations, the inhibition indication may cause a reduction in the probability that responses are generated by the units 1050 after the response time $t_{sal}$. Accordingly, the network output 1054 may comprise spikes associated with salient features within the image. In some variants, the output 1054 may not contain spikes associated with image background and/or other not salient features, thereby effectuating image compression and/or background removal. The original image may also be reconstructed from the compressed output using an arbitrary and/or pre-determined background (e.g., background of a certain color and/or brightness, etc.) in combination with the salient features within the processed image.

The sensory processing apparatus 1030 illustrated in FIG. 10B may further comprise feedback connections (not shown). In some implementations, the feedback connections may be configured to communicate contextual information to the input encoders, as described in detail in U.S. patent application Ser. No. 13/465,924, entitled "SPIKING NEURAL NETWORK FEEDBACK APPARATUS AND METHODS", filed May 7, 2012, incorporated supra.

Signals of two or more modalities, attributes and/or types may be combined by a processing apparatus in order to facilitate salient feature detections. In one or more implementations, an inhibitory signal (e.g., 144 in FIG. 10B) may be generated based on a first modality component of the input 1032 (e.g., infrared). This inhibition signal may be utilized by the neurons 10522 that are processing visual portion of the input 1032 so as to remove background. In some variants, the inhibition signal generated by the may be characterized by a spatial extent (e.g., 112 in FIG. 1A) thereby enabling the neurons 1050_2 to retain a visual representation of the object from the input 1032.

Visual Processing Apparatus

Figure 10C:
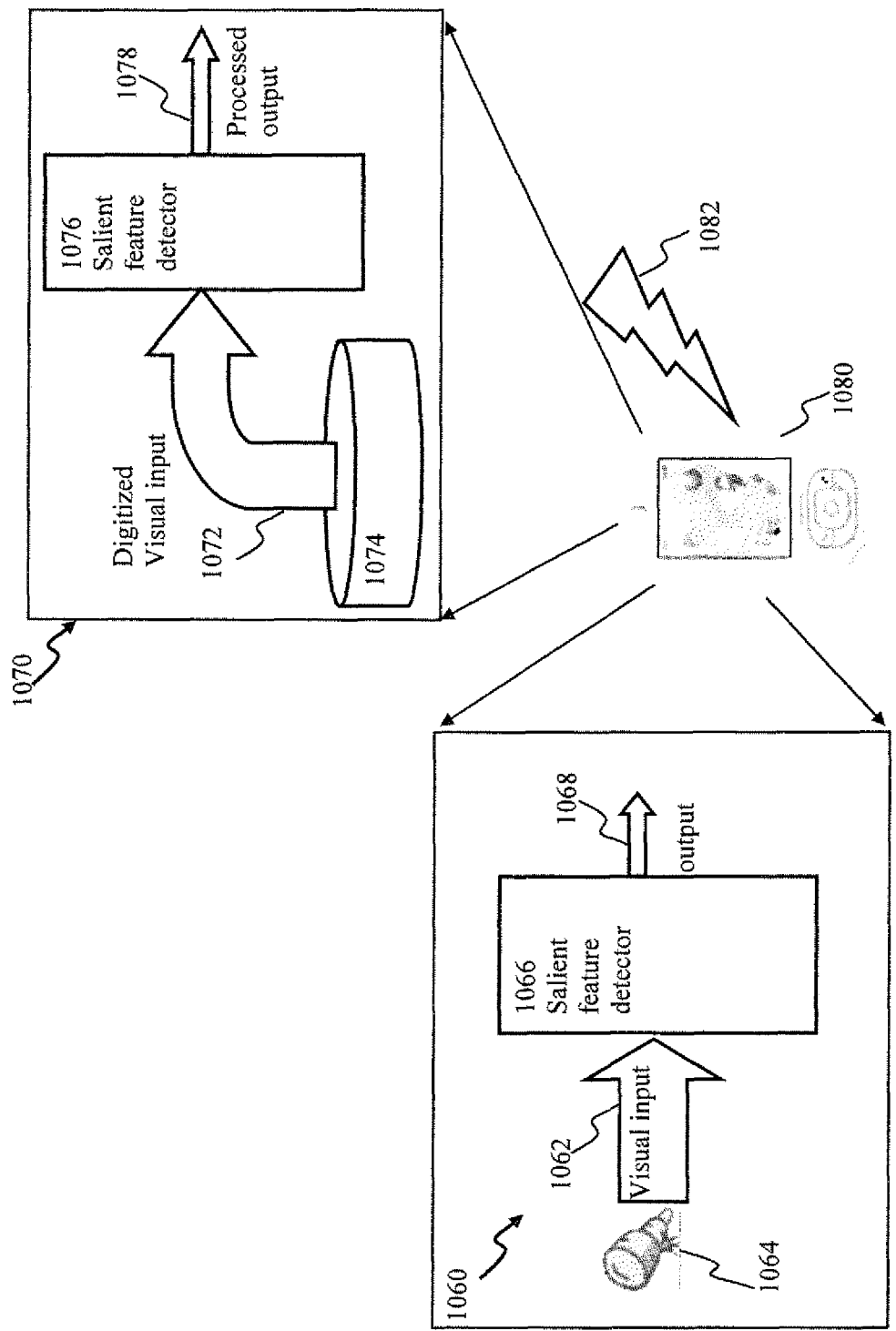
FIG. 10C is a block diagram illustrating an encoder apparatus (such as for instance that of FIG. 10A) configured for use in an image processing device adapted to process (i) visual signal; and/or (ii) processing of digitized image, in accordance with one or more implementations of the disclosure.

FIG. 10C, illustrates some exemplary implementations of the spiking network processing apparatus 1000 of FIG. 10A useful for visual encoding application. The visual processing apparatus 1060 of FIG. 10C may comprise a salient feature detector 1066, adapted for use with ambient visual input 1062. The detector 1066 of the processing apparatus 1060 may be disposed behind a light gathering block 1064 and receive ambient light stimulus 1062. In some implementations, the light gathering block 1064 may comprise a telescope, motion or still camera, microscope. Accordingly, the visual input 1062 may comprise ambient light captured by, inter glia, a lens. In some implementations, the light gathering block 1064 may an imager apparatus (e.g., CCD, or an active-pixel sensor array) so may generate a stream of pixel values.

In one or more implementations, the visual processing apparatus 1070 may be configured for digitized visual input processing. The visual processing apparatus 1070 may comprise a salient feature detector 1076, adapted for use with digitized visual input 1072. The visual input 1072 of FIG. 10C may comprise for example digitized frame pixel values (RGB, CMYK, grayscale) that may be refreshed from a digital storage device 1074 at a suitable rate.

The encoder apparatus 1066, 1076 may comprise for example the spiking neuron network, configured to detect salient features within the visual input in accordance with any of the methodologies described supra.

In one or more implementations, the visual capturing device 1160 and/or processing apparatus 1070 may be embodied in a portable visual communications device 1080, such as smartphone, digital camera, security camera, and/or digital video recorder apparatus. In some implementations the salient feature detection of the present disclosure may be used to compress visual input (e.g., 1062, 1072 in FIG. 10C) in order to reduce bandwidth that may be utilized for transmitting processed output (e.g., the output 1068, 1078 in FIG. 10C) by the apparatus 1080 via a wireless communications link 1082 in FIG. 10C.

Computerized Neuromorphic System

One particular implementation of the computerized neuromorphic processing system, for use with salient feature detection apparatus described supra, is illustrated in FIG. 11A. The computerized system 1100 of FIG. 11A may comprise an input device 1110, such as, for example, an image sensor and/or digital image interface. The input interface 1110 may be coupled to the processing block (e.g., a single or multiprocessor block) via the input communication interface 1114. In some implementations, the interface 1114 may comprise a wireless interface (cellular wireless, Wi-Fi, Bluetooth, etc.) that enables data transfer to the processor 1102 from remote I/O interface 1100, e.g. One such implementation may comprise a central processing apparatus coupled to one or more remote camera devices comprising salient feature detection apparatus of the disclosure.

The system 1100 further may comprise a random access memory (RAM) 1108, configured to store neuronal states and connection parameters and to facilitate synaptic updates. In some implementations, synaptic updates are performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra In some implementations, the memory 1108 may be coupled to the processor 1102 via a direct connection (memory bus) 1116, and/or via a high-speed processor bus 1112). In some implementations, the memory 1108 may be embodied within the processor block 1102.

The system 1100 may further comprise a nonvolatile storage device 1106, comprising, inter alia, computer readable instructions configured to implement various aspects of spiking neuronal network operation (e.g., sensory input encoding, connection plasticity, operation model of neurons, etc.). in one or more implementations, the nonvolatile storage 1106 may be used to store state information of the neurons and connections when, for example, saving/loading network state snapshot, or implementing context switching (e.g., saving current network configuration (comprising, inter alia, connection weights and update rules, neuronal states and learning rules, etc.) for later use and loading previously stored network configuration.

In some implementations, the computerized apparatus 1100 may be coupled to one or more external processing/storage/input devices via an I/O interface 1120, such as a computer I/O bus (PCI-E), wired (e.g., Ethernet) or wireless (e.g., Wi-Fi) network connection.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces are similarly applicable to embodiments of the invention including, for example, an LCD/LED monitor, touch-screen input and display device, speech input device, stylus, light pen, trackball, end the likes.

Figure 11B:
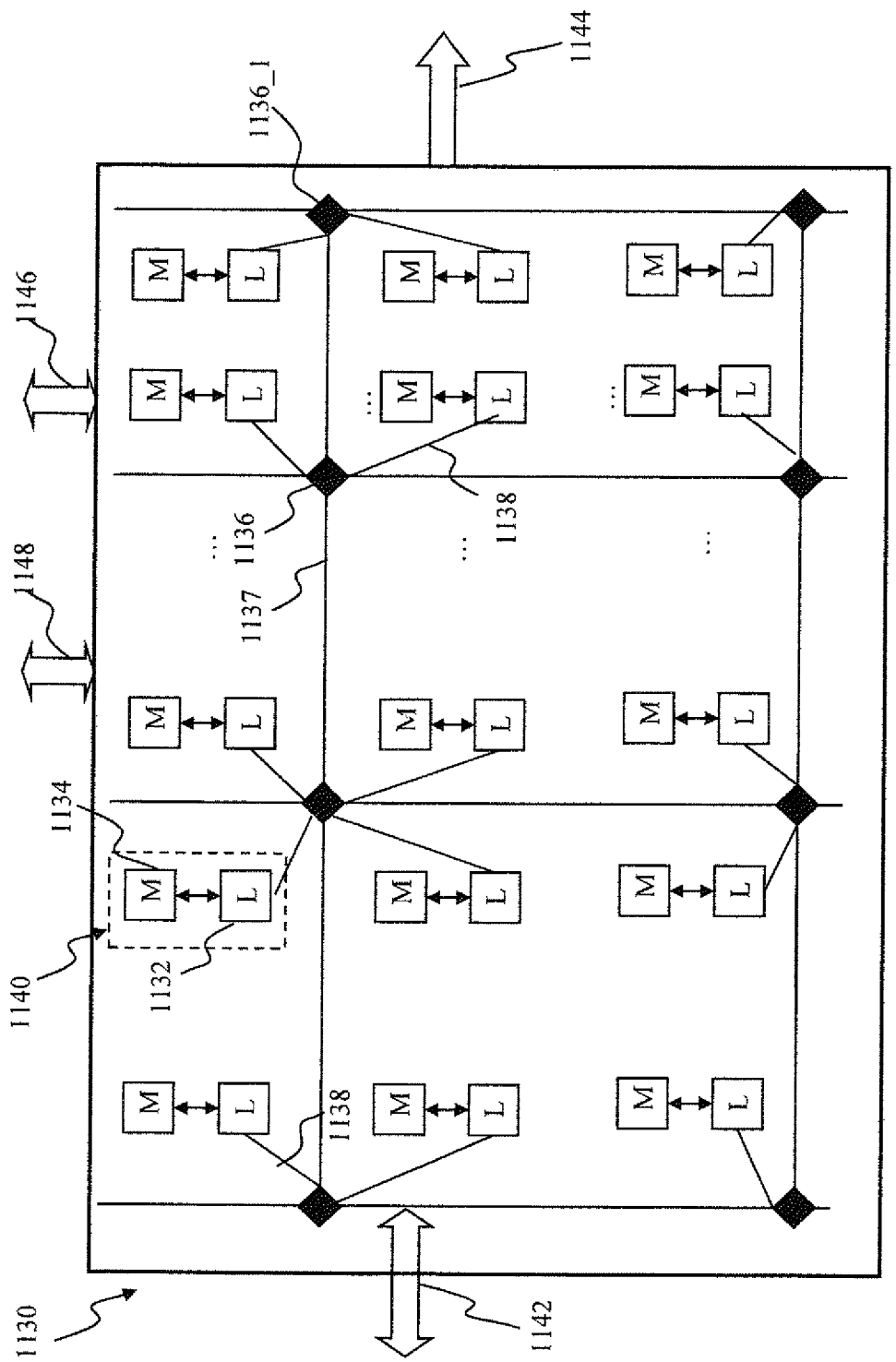
FIG. 11B is a block diagram illustrating a neuromorphic computerized system useful with useful with salient feature detection mechanism in accordance with one or more implementations.

FIG. 11B, illustrates one implementation of neuromorphic computerized system configured for use with salient feature detection apparatus described supra. The neuromorphic processing system 1130 of FIG. 11B may comprise a plurality of processing blocks (micro-blocks) 1140, where individual micro cores may comprise logic block 1132 and memory block 1134, denoted by and 'M' rectangles, respectively, in FIG. 11B. The logic block 1132 may be configured to implement various aspects of salient feature detection, such as the latency encoding of Eqn. 1, neuron unit dynamic model, detector nodes 1022 if FIG. 10A, and/or inhibitory nodes 1029 of FIG. 10A. The logic block may implement connection updates (e.g., the connections 1014, 1026 in FIG. 10A) and/or other tasks relevant to network operation. In some implementations, the update rules may comprise rules spike time dependent plasticity (STDP) updates. The memory block 1134 may be configured to store, inter alfa, neuronal state variables and connection parameters (e.g., weights, delays, I/O mapping) of connections 1138.

One or more micro-blocks 1140 may be interconnected via connections 1138, routers 1136, and/or a bus 1137. In one or more implementations (not shown), the router 1136 may be embodied within the micro-block 1140. As it is appreciated by those skilled in the arts, the connection layout in FIG. 11B is exemplary and many other connection implementations (e.g., one to all, all to all, etc.) are compatible with the disclosure.

The neuromorphic apparatus 1130 may be configured to receive input (e.g., visual input) via the interface 1142. In one or more implementations, applicable for example to interfacing with a pixel array. The apparatus 1130 may also provide feedback information via the interface 1142 to facilitate encoding of the input signal.

The neuromorphic apparatus 1130 may be configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). In one or more implementations, the apparatus 1130 may also interface to external slower memory (e.g., flash, or magnetic (hard drive)) via lower bandwidth memory interface 1146, in order to facilitate program loading, operational mode changes, and retargeting, where network node and connection information for a current task may be saved for future use and flushed, and previously stored network configuration may be loaded in its place, as described for example in co-pending and co-owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety.

Figure 11C:
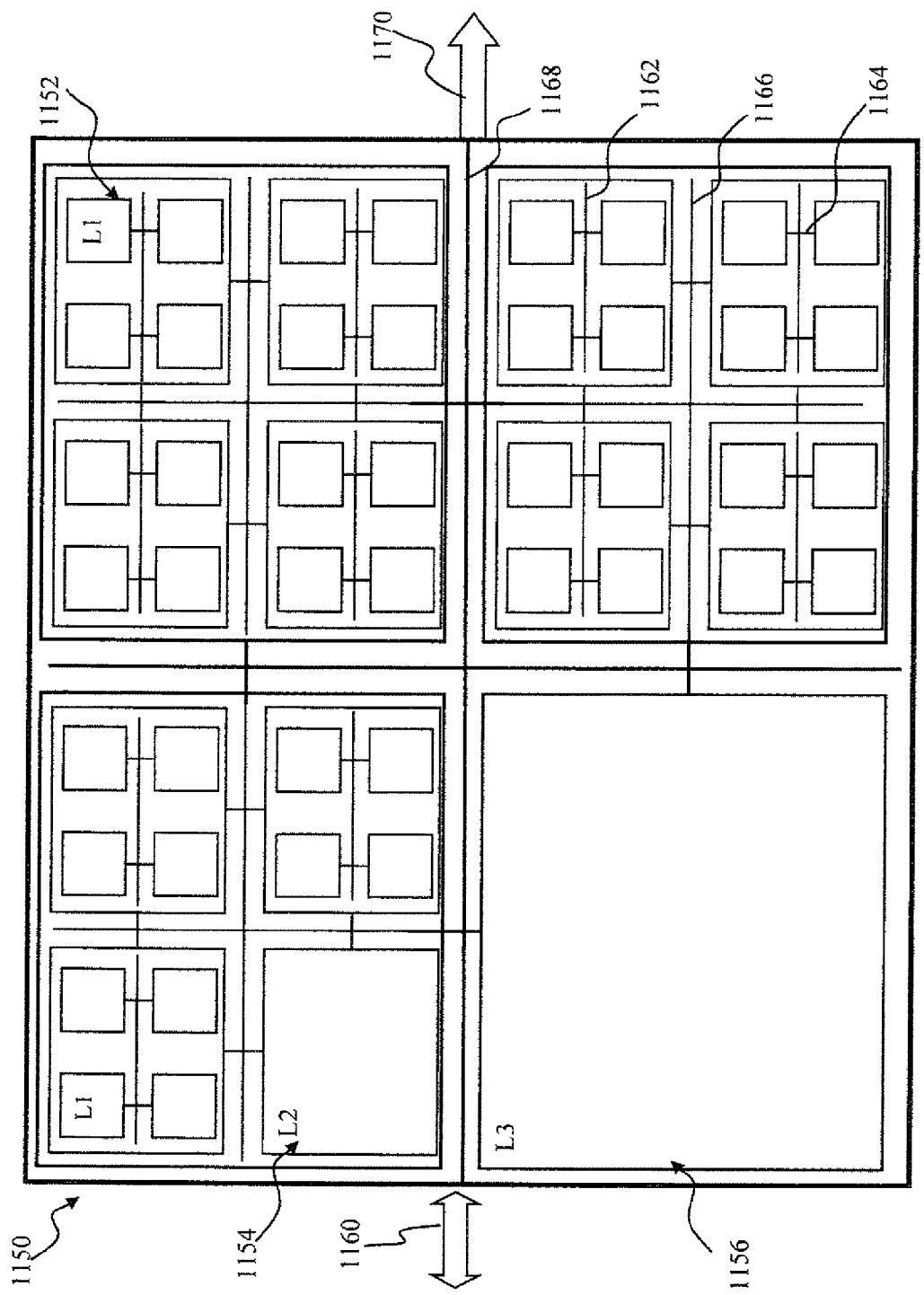
FIG. 11C is a block diagram illustrating a hierarchical neuromorphic computerized system architecture useful with salient feature detector apparatus configured in accordance with one or more implementations.

FIG. 11C, illustrates one implementation of cell-based hierarchical neuromorphic system architecture configured to implement salient feature detection. The neuromorphic system 1150 of FIG. 11C may comprise a hierarchy of processing blocks (cells block) 1140. In some implementations, the lowest level L1 cell 1152 of the apparatus 1150 may comprise logic and memory and may be configured similar to the micro block 1140 of the apparatus shown in FIG. 11B, supra. A number of cell blocks 1052 may be arranges in a cluster 1154 and communicate with one another via local interconnects 1162, 1164. Each such cluster may form higher level cell, e.g., cell denoted L2 in FIG. 11C. Similarly several L2 level clusters may communicate with one another via a second level interconnect 1166 and form a super-cluster L3, denoted as 1156 in FIG. 11C. The super-clusters 1156 may communicate via a third level interconnect 1168 and may form a higher-level cluster, and so on. It will be appreciated by those skilled in the arts that hierarchical structure of the apparatus 1150, comprising four cells-per-level, shown in FIG. 11C represents one exemplary implementation and other implementations may comprise more or fewer cells/level and/or fewer or more levels.

Different cell levels (e.g., L1, L2, L3) of the apparatus 1150 may be configured to perform functionality various levels of complexity. In one implementation, different L1 cells may process in parallel different portions of the visual input (e.g., encode different frame macro-blocks), with the L2, L3 cells performing progressively higher level functionality (e.g., edge detection, object detection). Different L2, L3, cells may perform different aspects of operating as well,—for example, a robot, with one or more L2/L3 cells processing visual data from a camera, and other L2/L3 cells operating motor control block for implementing lens motion what tracking an object or performing lens stabilization functions.

The neuromorphic apparatus 1150 may receive visual input (e.g., the input 1002 in FIG. 10) via the interface 1160. In one or more implementations, applicable for example to interfacing with a latency encoder and/or an image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (e.g., the I/O 1160 of FIG. 11C).

The apparatus 1150, in one or more implementations, may interface to external fast response memory (e.g., RAM) via high bandwidth memory interface (not shown), thereby enabling storage of intermediate network operational parameters (e.g., spike timing, etc.). The apparatus 1150 may also interface to a larger external memory (e.g., flash, or magnetic (hard drive)) via a lower bandwidth memory interface (not shown), in order to facilitate program loading, operational mode changes, and retargeting, where network node and connection information for a current task may be saved for future use and flushed, and previously stored network configuration may be loaded in its place, as described for example in co-pending and co-owned U.S. patent application Ser. No. 13/487,576, entitled "DYNAMICALLY RECONFIGURABLE STOCHASTIC LEARNING APPARATUS AND METHODS", incorporated supra.

In one or more implementations, networks of the apparatus 1130, 1145, 1150 may be implemented using Elementary Network Description (END) language, described for example in U.S. patent application Ser. No. 13/239,123, entitled "ELEMENTARY NETWORK DESCRIPTION FOR NEUROMORPHIC SYSTEMS", filed Sep. 21, 2011, and/or a High Level Neuromorphic Description (HLND) framework, described for example in U.S. patent application Ser. No. 13/385,938, entitled "TAG-BASED APPARATUS AND METHODS FOR NEURAL NETWORKS", filed Mar. 15, 2012, each of the foregoing being incorporated herein by reference in its entirety. In one or more implementations, the HLND framework may be configured to handle event-based update methodology described, for example U.S. patent application Ser. No. 13/588,774, entitled "APPARATUS AND METHODS FOR IMPLEMENTING EVENT-BASED UPDATES IN SPIKING NEURON NETWORK", filed Aug. 17, 2012, the foregoing being incorporated herein by reference in its entirety. In some implementations, the networks may be updated using an efficient network update methodology, described, for example, in U.S. patent application Ser. No. 13/239,259, entitled "APPARATUS AND METHOD FOR PARTIAL EVALUATION OF SYNAPTIC UPDATES BASED ON SYSTEM EVENTS", filed Sep. 21, 2011 and U.S. patent application Ser. No. 13/385,938, entitled "APPARATUS AND METHODS FOR EFFICIENT UPDATES SPIKING NEURON NETWORKS", filed Jul. 27, 2012, each of the foregoing being incorporated herein by reference in its entirety.

In some implementations, the HLND framework may be utilized to define network, unit type and location, and/or synaptic connectivity. HLND tags and/or coordinate parameters may be utilized in order to, for example, define an area of the localized inhibition of the disclosure described above In some implementations, the END may be used to describe and/or simulate large-scale neuronal model using software and/or hardware engines. The END allows optimal architecture realizations comprising a high-performance parallel processing of spiking networks with spike-timing dependent plasticity. Neuronal network configured in accordance with the END may comprise units and doublets, the doublets being connected to a pair of units. Execution of unit update rules for the plurality of units is order-independent and execution of doublet event rules for the plurality of doublets is order-independent.

In one or more implementations, the efficient update methodology (e.g., for adjusting input connections and/or inhibitory traces) may comprise performing of pre-synaptic updates first, followed by the post-synaptic updates, thus ensuring the up-to-date status of synaptic connections.

In some implementations, the efficient update methodology may comprise rules, configured to adjust inhibitory trace without necessitating evaluation of the neuron post-synaptic response.

Performance Results

Figure 9A:
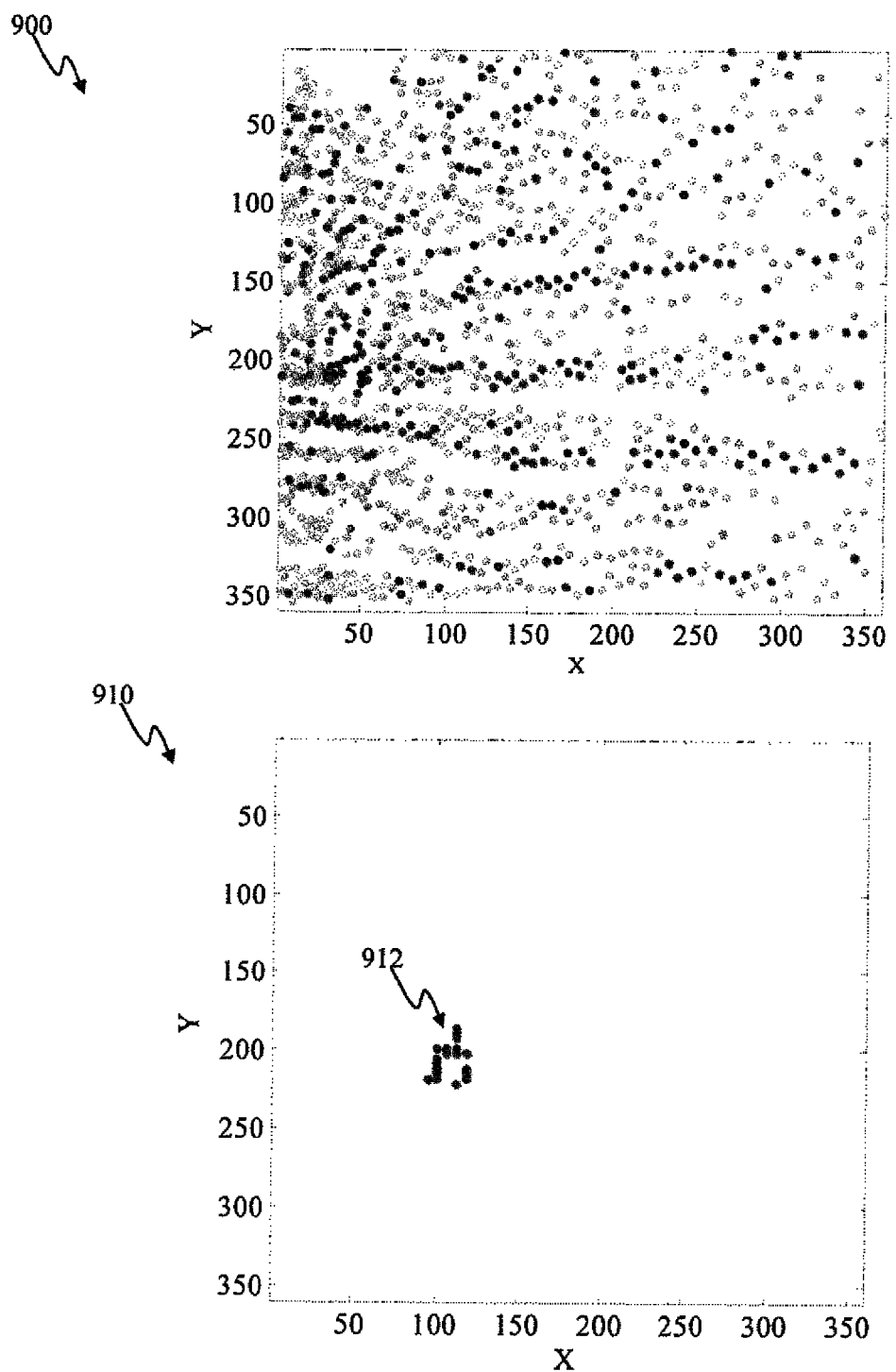
FIG. 9A is a plot illustrating detection of salient features using inhibition of late responding units, in accordance with one implementation of the disclosure.
Figure 9B:
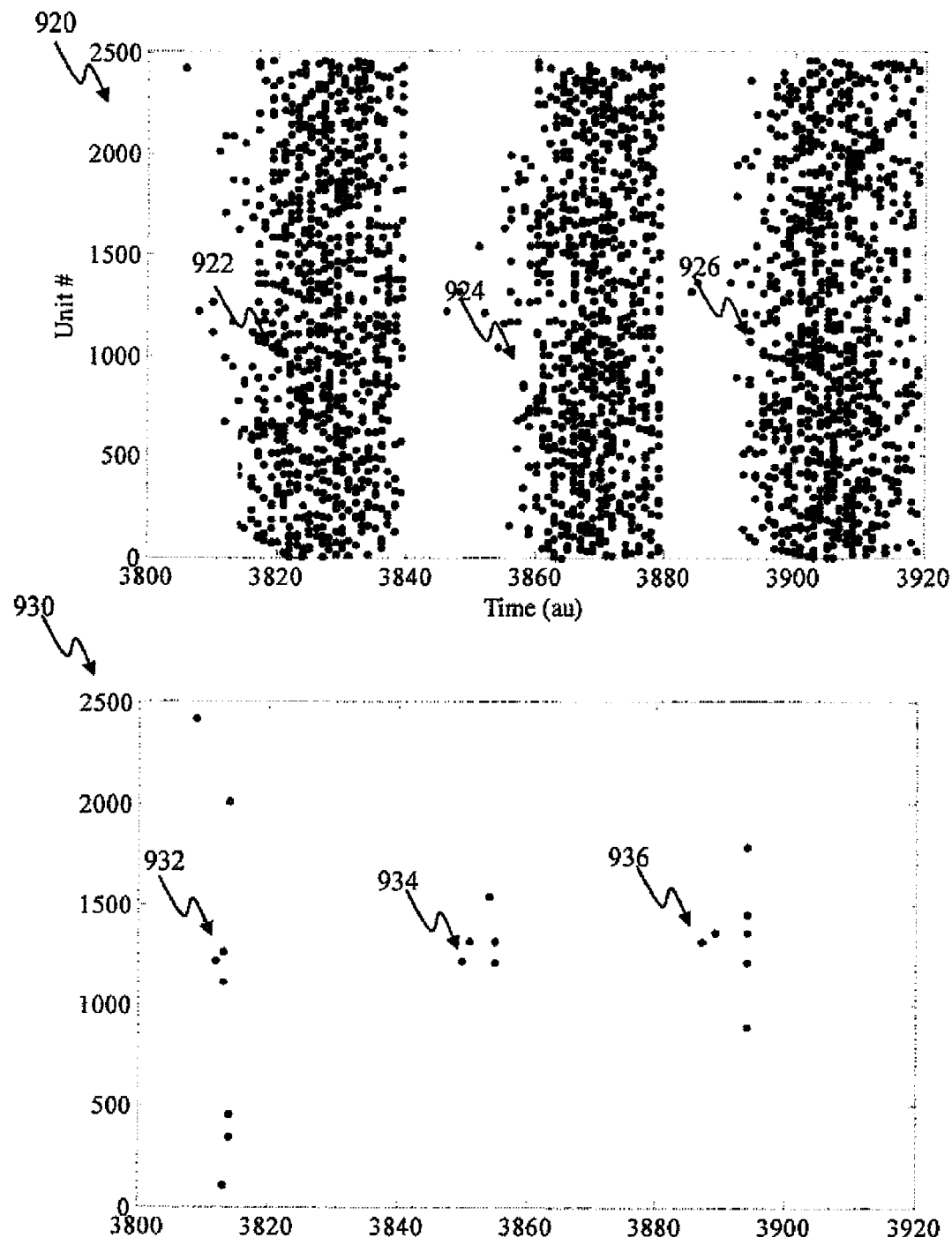
FIG. 9B is a plot illustrating frame background removal using inhibition of late responding units, in accordance with one implementation of the disclosure.
Figure 9C:
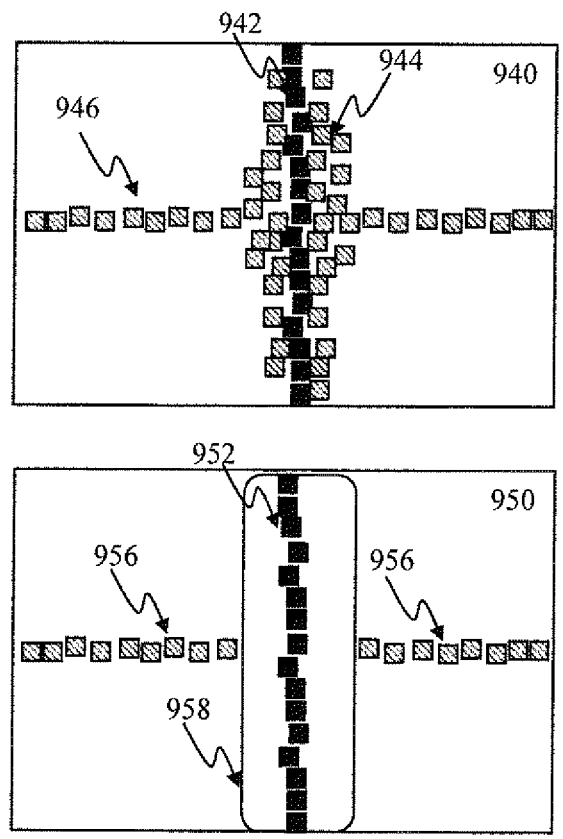
FIG. 9C is a plot illustrating frame contrast normalization using spatially controlled inhibition of late responding units, in accordance with one implementation of the disclosure.

FIGS. 9A through 9C present performance results obtained during simulation and testing by the Assignee hereof, of exemplary salient feature detection apparatus (e.g., the apparatus 1000 of FIG. 10A) configured in accordance with the temporal-winner takes all methodology of the disclosure. Panel 900 of FIG. 9A presents sensory input, depicting a single frame of pixels of a size (X,Y). Circles within the frame 900 depict pixel brightness. The pixel array 900 comprises a representation of a runner that is not easily discernible among the background noise.

Pixel brightness of successive pixel frames (e.g., the frames 900) may be encoded by spiking neuron network, using any of applicable methodologies described herein. One encoding realization is illustrated in panel 920 of FIG. 9B comprising encoding output 922, 924, 926 of three consecutive frames. The frames are refreshed at about 25 Hz, corresponding to the encoding duration of 40 ms in FIG. 9B. The network used to encode data shown in FIG. 9B comprises 2500 excitatory units and a single inhibitory unit. Each dot within the panel 920 represents single excitatory unit spike in the absence of inhibitory TWTA mechanism of the present disclosure.

Panel 930 illustrates one example of performance of the temporal winner takes all approach of the disclosure, applied to the data of panel 920. The pulse groups 932, 934, 936 in panel 940 depict excitatory unit spikes that occur within the encoded output 922, 924, 926, respectively, within the saliency window, e.g., a time period between 1 and 10 ms (e.g., 5 ms in the exemplary implementation) prior to the generation of inhibition signal. The excitatory unit output is inhibited subsequent to generation of the inhibitory indications (not shown) that are based on the winner responses 932, 934, 936.

In some implementations, the winner response (e.g., the pulse group 932 in FIG. 9B) may be used to accurately detect the salient feature (e.g., the runner) within the frame 900. Panel 910 of FIG. 9A illustrates pixel representation of the runner, obtained from the data of panel 900, using the winner takes all pulse group 932 of FIG. 9B. The data presented in FIGS. 9A-9B are averaged over three frames to improve saliency detection. In some implementations, spatial averaging may be employed prior to the WTA processing in order to, inter glia, improve stability of the winner estimate. For the exemplary data shown in FIGS. 9A-9B, an irregular averaging mask comprising approximately 40 pixels was used to perform spatial averaging. The results presented in FIGS. 9A-9B illustrate that TWTA methodology of the disclosure is capable of extracting salient features, comprising a fairly low number of pixels (about 20 in panel 910 of FIG. 9A), from a fairly large (about 130,000 in panel 900 of FIG. 9A) and complex input population of pixels.

FIG. 9C illustrates image local contrast enhancement obtained using local inhibition and WTA mechanism according to one embodiment of the disclosure. Panel 940 in FIG. 9C presents original input, comprising a vertical bar (depicted by solid pixels, e.g., 942 in FIG. 9C) and a horizontal bar, (depicted by hashed pixels, e.g., 946 in FIG. 9B). The salient feature (e.g., the vertical bar in FIG. 9C) is enveloped by a 'halo', comprising a plurality of pixels (depicted by hashed pixels, e.g., 944 in FIG. 9C). In some implementations, it may be desired to remove the undesired halo pixels while preserving the salient and/or the secondary features (the vertical and the horizontal bars, respectively).

Pixel brightness (and/or color) of successive pixel frames (e.g., the frames 940) may be encoded by spiking neuron network, using local inhibition and WTA mechanism of the disclosure described herein. The results of the encoding may be reconstructed to produce an enhanced image. One realization of such enhancement is illustrated in panel 950 of FIG. 9C, presenting the solid pixels 952 forming the vertical bar and the hashed pixels 956 forming the horizontal bar. It is noteworthy that the hashed pixels within the area of local inhibition (depicted by the curve 958) are removed, thereby increasing the contrast between pixels 952 and the panel 950 background.

Exemplary Uses and Applications of Certain Aspects of the Disclosure

Various aspects of the disclosure may advantageously be applied to design and operation of apparatus configured to process sensory data.

The results presented in FIGS. 9A-9B confirm that the methodology of the disclosure is capable of effectively isolating salient features within sensory input. In some implementations, the salient feature detection capability may be used to increase signal-to-noise (SNR) ratio by, for example, removing spatially/and or temporally incoherent noise (e.g., 'salt and pepper') from input images. In some implementations, the salient feature detection capability may be used to remove non-salient features (e.g., image background), thereby facilitating image compression and/or SNR increase. The salient feature detection capability may also enable removal of a large portion of spikes from an encoded image, thereby reducing encoded data content, and effectuating image compression.

The principles described herein may be combined with other mechanisms of data encoding in neural networks, as described in for example U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", and U.S. patent application Ser. No. 13/152,105 filed on Jun. 2, 2011, and entitled "APPARATUS AND METHODS FOR TEMPORALLY PROXIMATE OBJECT RECOGNITION", incorporated, supra.

Advantageously, exemplary implementations of the present innovation may be useful in a variety of applications including, without limitation, video prosthetics, autonomous and robotic apparatus, and other electromechanical devices requiring video processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Implementations of the principles of the disclosure are applicable to video data processing (e.g., compression) in a wide variety of stationary and portable video devices, such as, for example, smart phones, portable communication devices, notebook, netbook and tablet computers, surveillance camera systems, and practically any other computerized device configured to process vision data Implementations of the principles of the disclosure are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, various of the teachings of the disclosure can be used to simplify tasks related to motion estimation, such as where an image sequence is processed to produce an estimate of the object position and velocity (either at each point in the image or in the 3D scene, or even of the camera that produces the images). Examples of such tasks include ego motion, i.e., determining the three-dimensional rigid motion (rotation and translation) of the camera from an image sequence produced by the camera, and following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed:

1. A non-transitory computer-readable apparatus configured to store at least one computer process thereon, the computer process configured to detect an object in a sensory input, the computer process comprising a plurality of instructions configured to, when executed:
    based on at least one excitatory signal, generate an inhibitory signal configured to suppress generation of another excitatory signal, and thereby enable the object detection;
    wherein:
    the sensory input comprises a plurality of spikes associated with a first sensory modality and a second sensory modality;
    the at least one excitatory signal comprising one or more pulses generated based on a portion of the sensory input comprising first representation of the object based on the first sensory modality;
    the another excitatory signal comprising another one or more pulses configured to be generated based on another portion of the sensory input comprising second representation of the object based on the second sensory modality; and
    the first representation of the object being characterized by a parameter having a value that is different from a value of the parameter associated with the sensory input of the first sensory modality in an area proximate to the object.

2. The apparatus of claim 1, wherein:
    the first sensory modality comprises an infrared spectrum image comprising the first representation of the object;
    the second sensory modality comprises a visible-light image comprising the second representation of the object;
    the one or more pulses are characterized by a first range of latencies; and
    the another one or more pulses are characterized by a second range of latencies, the latencies within the second range being greater in magnitude than the latencies within the first range.

3. The apparatus of claim 2, wherein:
    the parameter is configured to characterize a luminance of pixels within the image; and
    individual latencies within the first range of latencies are encoded based on a logarithmic function of pixel luminance.

4. The apparatus of claim 2, wherein the inhibitory signal is effectuated by an inhibition trace, the inhibition trace being incremented responsive to a pulse latency of the one or more pulses being within a latency window.

5. The apparatus of claim 2, wherein:
    the inhibitory signal is generated based on another sensory input of the first sensory modality comprising another representation of the object, the another sensory input preceding the sensory input; and
    a time interval between the sensory input and the another sensory input is greater than the first range of latencies.

6. The apparatus of claim 1, wherein:
    the first sensory modality comprises an audio signal comprising the first representation of the object;
    the second sensory modality comprises a visible-light image comprising the second representation of the object;
    the at least one excitatory signal comprises one or more pulses having a first range of latencies associated therewith; and
    the another excitatory signal is configured based on a second range of latencies, the latencies within the second range being greater than the latencies within the first range.

7. The apparatus of claim 1, wherein:
    the sensory input comprises an image comprising the first representation of the object;
    the inhibitory signal is configured to transform the image into a spiking representation comprising at least one feed-forward signal;
    the inhibitory signal is characterized by an inhibition area within the image;
    the first representation of the object is characterized by an object area; and
    the spiking representation is characterized by absence of spikes corresponding to pixels of the image that are outside the object area and within the inhibition area.

8. A method of detecting one or more salient features within an image set with a spiking neuron network, the method comprising:
    providing a first stimulus comprising a first spectral parameter of a first image of the image set to a first portion of the network;
    providing a second stimulus comprising a second spectral parameter of a second image of the image set to a second portion of the network;
    based at least in part on the provision of the first stimulus, causing generation of a plurality of pulses by the first portion of the network, the plurality of pulses encoding the first spectral parameter into a pulse latency;
    generating an inhibition signal based at least in part on two or more pulses of the plurality of pulses, the two or more pulses being proximate one another within a time interval; and
    based at least in part on the inhibition signal, suppressing responses to the second stimulus by at least one neuron of the second portion.

9. The method of claim 8, wherein:
the providing of the second stimulus is characterized by a stimulus duration, the stimulus duration being greater than the time interval; and
the suppressing of the responses is characterized by an absence of responses from the second portion during the stimulus duration.

10. The method of claim 8, wherein:
the providing of the second stimulus is characterized by a stimulus duration, the stimulus duration being greater than the time interval; and
the suppressing of the responses comprises reducing a number of responses from the second portion during the stimulus duration as compared to a number of responses that are generated by the second portion during the stimulus duration and responsive to the second stimulus.

11. The method of claim 8, wherein:
providing of the second stimulus is characterized by a stimulus duration, the stimulus duration being greater than the time interval; and
the suppressing of the responses comprises reducing a probability of response generation by the at least one neuron within the second portion during the stimulus duration and responsive to the second stimulus.

12. The method of claim 8, wherein:
the providing of the second stimulus causes generation of a burst of pulses by at least one neuron of the network; and
the suppressing of the responses comprises suppressing at least a portion of the pulses within the burst from being generated responsive to the second stimulus.

13. The method of claim 8, wherein the suppressing of the responses is based at least in part on at least one of the two or more pulses.

14. A spiking neuron network processing apparatus configured to process sensory input comprising at least two attributes, the apparatus comprising:
one or more encoders configured to:
receive the sensory input; and
encode the sensory input to produce a plurality of pulses;
a detector bank comprising one or more detectors associated with each of the at least two attributes, each of the one or more detectors configured to:
receive an encoded input for an associated attribute; and
based on the encoded input generate a respective feed-forward signal; and
at least one inhibitory unit configured to:
receive the respective feed-forward signal;
in response to the received feed-forward signal, produce a feedback signal; and
transmit the feedback signal to at least one of the one or more detectors;
wherein the feedback signal is configured to alter a response generation parameter of at least one of the one or more detectors.

15. The apparatus of claim 14, wherein the at least two attributes comprise two different sensory modalities.

16. The apparatus of claim 15, wherein the two different sensory modalities comprise a visible-light image and an audio stream.

17. The apparatus of claim 14, wherein the one or more detectors associated with each of the at least two attributes comprises at least one dedicated detector for each of the at least two attributes.

18. The apparatus of claim 14, wherein the one or more detectors associated with each of the at least two attributes comprises a single detector associated with all of the at least two attributes.

19. The apparatus of claim 14, wherein the feedback signal is configured to reduce the probability of response generation by the at least one of the one or more detectors.

20. The apparatus of claim 14, wherein the feedback signal is configured to increase the probability of response generation by the at least one of the one or more detectors.

* * * * *